(12) United States Patent
Nakamura et al.

(10) Patent No.: US 12,425,547 B2
(45) Date of Patent: Sep. 23, 2025

(54) VEHICLE SERVICE PROVIDING SYSTEM

(71) Applicant: SUBARU CORPORATION, Tokyo (JP)

(72) Inventors: Ryota Nakamura, Tokyo (JP); Konan Kagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/583,123

(22) Filed: Feb. 21, 2024

(65) Prior Publication Data

US 2024/0195943 A1 Jun. 13, 2024

Related U.S. Application Data

(63) Continuation of application No. PCT/JP2022/033979, filed on Sep. 11, 2022.

(51) Int. Cl.
| | |
|---|---|
| *H04N 7/18* | (2006.01) |
| *G06F 21/62* | (2013.01) |
| *G06T 3/18* | (2024.01) |
| *G06V 20/59* | (2022.01) |
| *G06V 40/16* | (2022.01) |

(52) U.S. Cl.
CPC ......... *H04N 7/183* (2013.01); *G06F 21/6245* (2013.01); *G06T 3/18* (2024.01); *G06V 20/59* (2022.01); *G06V 40/162* (2022.01); *G06V 40/165* (2022.01); *G06V 40/171* (2022.01)

(58) Field of Classification Search
CPC ....... H04N 7/183; G06F 21/6245; G06T 3/18; G06T 1/00; G06T 7/00; G06V 20/59; G06V 40/162; G06V 40/165; G06V 40/171; G08G 1/16

USPC .......................................................... 348/36
See application file for complete search history.

(56) References Cited

U.S. PATENT DOCUMENTS

| | | | |
|---|---|---|---|
| 8,744,119 B2 * | 6/2014 | Shuster | G06F 21/32 382/100 |
| 2012/0177248 A1 * | 7/2012 | Shuster | G06V 40/16 382/100 |
| 2020/0097767 A1 * | 3/2020 | Perry | G06V 40/172 |
| 2022/0289250 A1 | 9/2022 | Oba | |

(Continued)

FOREIGN PATENT DOCUMENTS

| | | |
|---|---|---|
| JP | 2014-067131 A | 4/2014 |
| JP | 2020-156033 A | 9/2020 |

(Continued)

*Primary Examiner* — Marnie A Matt
(74) *Attorney, Agent, or Firm* — Rimon P.C.

(57) ABSTRACT

A vehicle of a system that provides a service includes an in-vehicle camera configured to capture an image of an occupant of the vehicle, and a vehicle controller. A sever apparatus includes an output unit and a server controller. The vehicle controller segments a captured region of a face of the occupant from the captured image by the in-vehicle camera, and generates point group information and patch information for the face regarding a segmented face image of the occupant. The vehicle controller executes a morphing process on a sample face image with use of the point group information and the patch information regarding the face image of the occupant, to generate a morphed face image to be transmitted to the server apparatus instead of the face image of the occupant.

12 Claims, 11 Drawing Sheets

(56) References Cited

U.S. PATENT DOCUMENTS

2024/0087340 A1* 3/2024 Kagawa ............... G06V 40/171
2024/0193966 A1* 6/2024 Nakamura ............. G06V 20/59

FOREIGN PATENT DOCUMENTS

| JP | 2020157408 A | * | 10/2020 | ................ | B25J 9/10 |
| JP | 2021-043571 A | | 3/2021 | | |
| JP | 2021049635 A | * | 4/2021 | .............. | B25J 13/00 |

\* cited by examiner

VEHICLE SERVICE PROVIDING SYSTEM

CROSS-REFERENCE TO RELATED APPLICATIONS

This application is continuation of International Application No. PCT/JP2022/033979, filed on Sep. 11, 2022, the entire contents of which are hereby incorporated by reference.

BACKGROUND

The invention relates to a vehicle service providing system.

A vehicle such as an automobile can have a malfunction of the vehicle itself while traveling, or an occupant of the vehicle can feel ill while traveling.

Moreover, sometimes, it is desirable that various content services be available to an occupant of a vehicle while traveling.

These vehicle services may include, for example, an emergency response service, an occupant monitoring service for the emergency response service, and a content providing service. The emergency response service includes dealing with a malfunction of a vehicle or illness of an occupant.

When such a vehicle service providing system provides a vehicle service, basically, a vehicle transmits information to a server apparatus, and the server apparatus provides the service based on the information received.

The following Patent Literatures are referred to this application.

Patent Literature 1: Japanese Unexamined Patent Application Publication No. 2021-043571
Patent Literature 2: Japanese Unexamined Patent Application Publication No. 2014-067131
Patent Literature 3: Japanese Unexamined Patent Application Publication No. 2020-156033

SUMMARY

A vehicle service providing system according to an embodiment of the invention includes a vehicle and a server apparatus. The vehicle transmits information to the server apparatus. The server apparatus provides a service based on the information received. The vehicle includes an in-vehicle camera and a vehicle controller. The in-vehicle camera is configured to capture an image of an occupant of the vehicle. The server apparatus includes an output unit and a server controller. The output unit outputs an image. The vehicle controller is configured to execute at least an occupant image acquisition process, a segmentation process, a point group generation process, and a patch generation process, among the occupant image acquisition process, the segmentation process, the point group generation process, the patch generation process, a sample face image acquisition process, and a morphing process. The occupant image acquisition process is a process of acquiring a captured image including a face of the occupant, from the in-vehicle camera. The segmentation process is a process of segmenting a captured region of the face of the occupant from the acquired captured image. The point group generation process is a process of generating point group information regarding the face, the point group information indicating an outline of the face and positions of elements of the face, in the segmented captured region of the face of the occupant. The patch generation process is a process of generating patch information with use of the generated point group information as a reference for image separation, the patch information separating the segmented captured region of the face of the occupant. The sample face image acquisition process is a process of acquiring information regarding a sample face image with which point group information and patch information are associated, as information regarding a face image different from the occupant to be segmented from the captured image. The morphing process is a process of carrying out morphing using the point group information and the patch information generated regarding the occupant, for the point group information and the patch information regarding the sample face image, to generate a morphed face image. The vehicle controller is configured to transmit information generated by the processes to the server apparatus, instead of the captured image including the face of the occupant. The server controller is configured to execute, with use of the information received from the vehicle controller of the vehicle, a process not executed by the vehicle controller, among the segmentation process, the point group generation process, the patch generation process, the sample face image acquisition process, and the morphing process, and cause the output unit to output the morphed face image generated by the morphing process, instead of a face image of the occupant of the vehicle.

BRIEF DESCRIPTION OF THE DRAWINGS

FIG. 8 is an explanatory diagram of an example of a captured image by an in-vehicle camera in FIG. 4.

FIG. 9 is an explanatory diagram of an example of a face image as a captured region of a face of a driver segmented from the captured image in FIG. 8.

FIG. 10 is an explanatory diagram of an example of point group information to be generated regarding the face image of the driver in FIG. 9.

FIG. 11 is an explanatory diagram of an example of patch information to be generated regarding the face image of the driver in FIG. 9.

FIG. 12 is an explanatory diagram of an example of a sample face image as a face image of another person different from the driver.

FIG. 13 is an explanatory diagram of an example of point group information to be generated regarding the sample face image in FIG. 12.

FIG. 14 is an explanatory diagram of an example of patch information to be generated regarding the sample face image in FIG. 12.

FIG. 15 is an explanatory diagram of an example of a morphed face image to be transmitted from the automobile 2 to the outside as a face image of an occupant.

DETAILED DESCRIPTION

Figure 1:
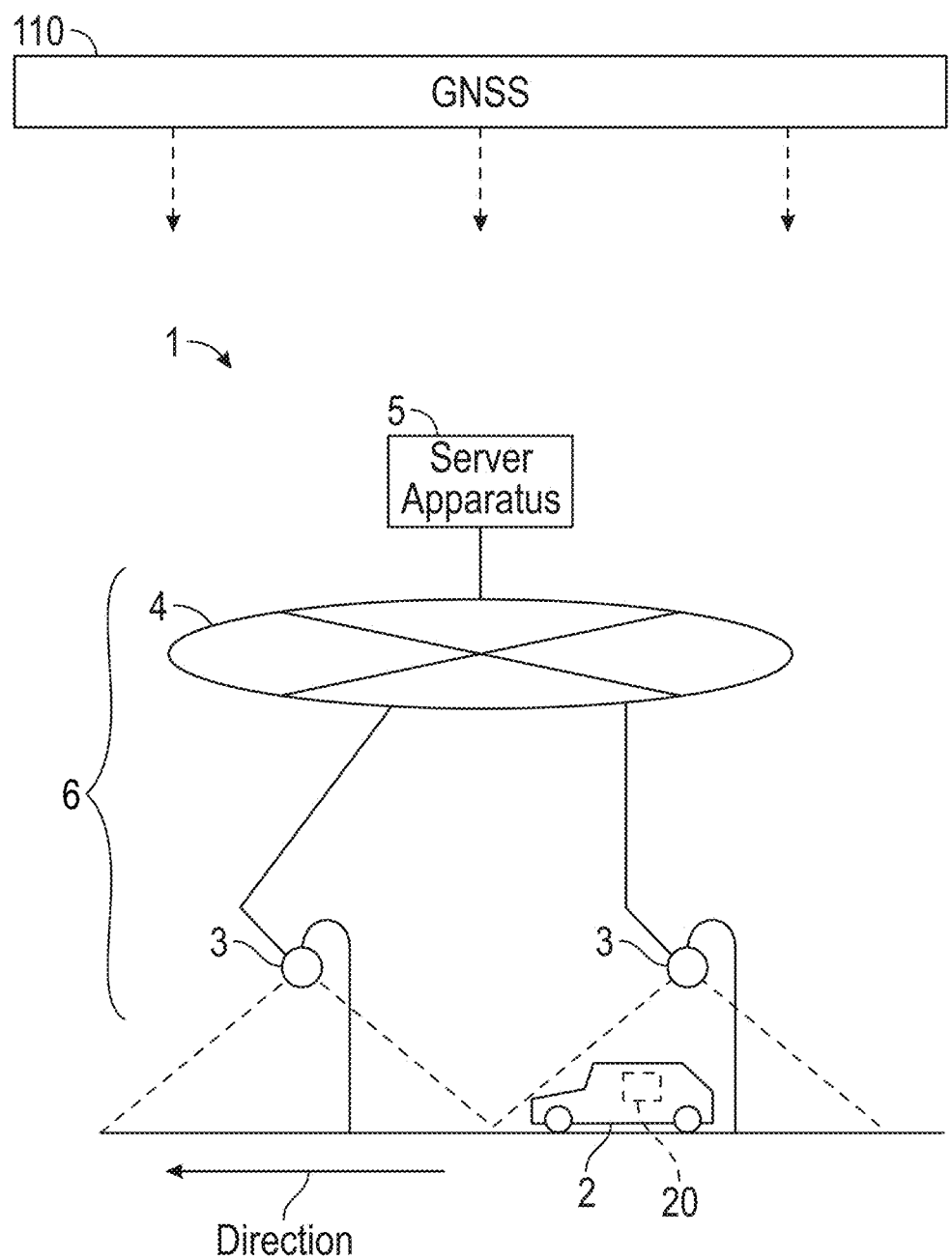
FIG. 1 is a system configuration diagram of a vehicle service providing system according to a first embodiment of the invention.

Incidentally, when such a vehicle service providing system provides, in particular, an emergency response service and an occupant monitoring service described above, the vehicle service providing system is presumably strongly expected to transmit, for example, a captured image by an in-vehicle camera from a vehicle to a server apparatus. The captured image indicates a state of an occupant. The captured image by the in-vehicle camera is outputted to and displayed on the server apparatus, making it possible for an operator to accurately grasp, for example, a current state and expression of the occupant, based on the captured image of the occupant. This results in provision of an optimal service for the current state of the occupant, etc.

On the other hand, depending on the kind of information, information transmission from the vehicle to the server apparatus as described above may be restricted based on, for example, laws and regulations. For example, in Europe, independent strict restrictions have been imposed on transmission and reception of personally identifiable information.

Moreover, a company that intends to deal with protection of such personal information would like to voluntarily put favorable limitations on the information to be transmitted from a vehicle to a server apparatus.

The captured image of the occupant of the vehicle described above includes an image component of the face of the occupant. The face of the occupant is personal information and deserves appropriate protection.

Patent Literatures 1 to 3 disclose abstraction, substitution, or masking of an image of the face of an occupant included in a captured image.

However, when the image of the face of the occupant is abstracted, substituted, or masked as in Patent Literatures 1 to 3 and the image is outputted to a server apparatus, an operator can have difficulty in accurately grasping, for example, the current state or the expression of the occupant.

As described, what is desired for a vehicle service providing system is to protect personal information while avoiding impairment of convenience of the vehicle service providing system.

In the vehicle service providing system according to the invention, the vehicle controller of the vehicle and the server controller of the server apparatus execute the occupant image acquisition process, the segmentation process, the point group generation process, the patch generation process, the sample face image acquisition process, and the morphing process. The server controller causes the output unit to output the morphed face image generated by the morphing process, instead of the face image of the occupant of the vehicle. This allows the output unit to output the face image that reflects the state of the occupant, e.g., the expression of the occupant. As a result, it is possible for the operator to grasp, for example, the current actual state or the expression of the occupant based on the face image outputted.

In contrast, if, for example, the face image of the occupant is abstracted, substituted, or masked, it is difficult for the operator to accurately grasp, for example, the current actual state or the expression of the occupant based on the image.

Moreover, the vehicle controller of the vehicle executes at least the occupant image acquisition process, the segmentation process, the point group generation process, and the patch generation process, among the occupant image acquisition process, the segmentation process, the point group generation process, the patch generation process, the sample face image acquisition process, and the morphing process. The vehicle controller of the vehicle transmits the information generated by the processes to the server apparatus, instead of the captured image including the face of the occupant. Hence, it is possible for the vehicle according to the invention to refrain from transmitting the face image of the occupant itself to the outside. The face image of the occupant deserves protection as personal information regarding the occupant.

As described, in the invention, it is possible to protect personal information while avoiding impairment of convenience of the vehicle service providing system.

In the following, some embodiments of the invention are described with reference to the accompanying drawings.

First Embodiment

FIG. 1 is a configuration diagram of a vehicle service providing system 1 according to a first embodiment of the invention.

The vehicle service providing system 1 in FIG. 1 includes an automobile 2 and a server apparatus 5. The server apparatus 5 is configured to provide the automobile 2 with a vehicle service. The automobile 2 and the server apparatus 5 transmit and receive information to and from each other through a communication network system 6.

Here, the automobile 2 is an example of a vehicle. Basically, the automobile 2 may be configured to accommodate multiple occupants. In the automobile 2 configured to accommodate multiple occupants, a driver and an assistant may be seated side by side in a vehicle width direction. However, the vehicle to which the invention is applicable is not limited to the automobile 2 having such features.

The communication network system 6 in FIG. 1 includes multiple base stations 3 and a communication network 4. The base stations 3 are arranged along a travel route of the automobile 2. To the communication network 4, the base stations 3 and the server apparatus 5 are coupled. The base stations 3 may be, for example, base stations of a carrier communication network for mobile terminals, etc. Alternatively, the base stations 3 may be base stations for an ITS service or an ADAS service for the automobile 2. Some fifth-generation base stations of carrier communication networks have a high-performance information processing function. In this case, the server apparatus 5 may be distributively provided in the base stations 3.

The automobile 2 can sometimes have a malfunction of the automobile 2 itself while traveling, or an occupant of the automobile 2 can feel ill while traveling.

Moreover, an occupant sometimes uses various kinds of content services while traveling in the automobile 2. Examples of the content services include a music distribution service and a video distribution service.

The vehicle service providing system 1 is configured to provide the automobile 2 with these vehicle services, by using the server apparatus 5 that transmits and receives information to and from the automobile 2. The vehicle service providing system 1 may provide, for example, an emergency response service and a monitoring service for the emergency response service. The emergency response service includes, for example, dealing with a malfunction of the automobile 2 or the illness of the occupant of the automobile 2. Moreover, the vehicle service providing system 1 may allow the server apparatus 5 to provide content information.

Figure 2:
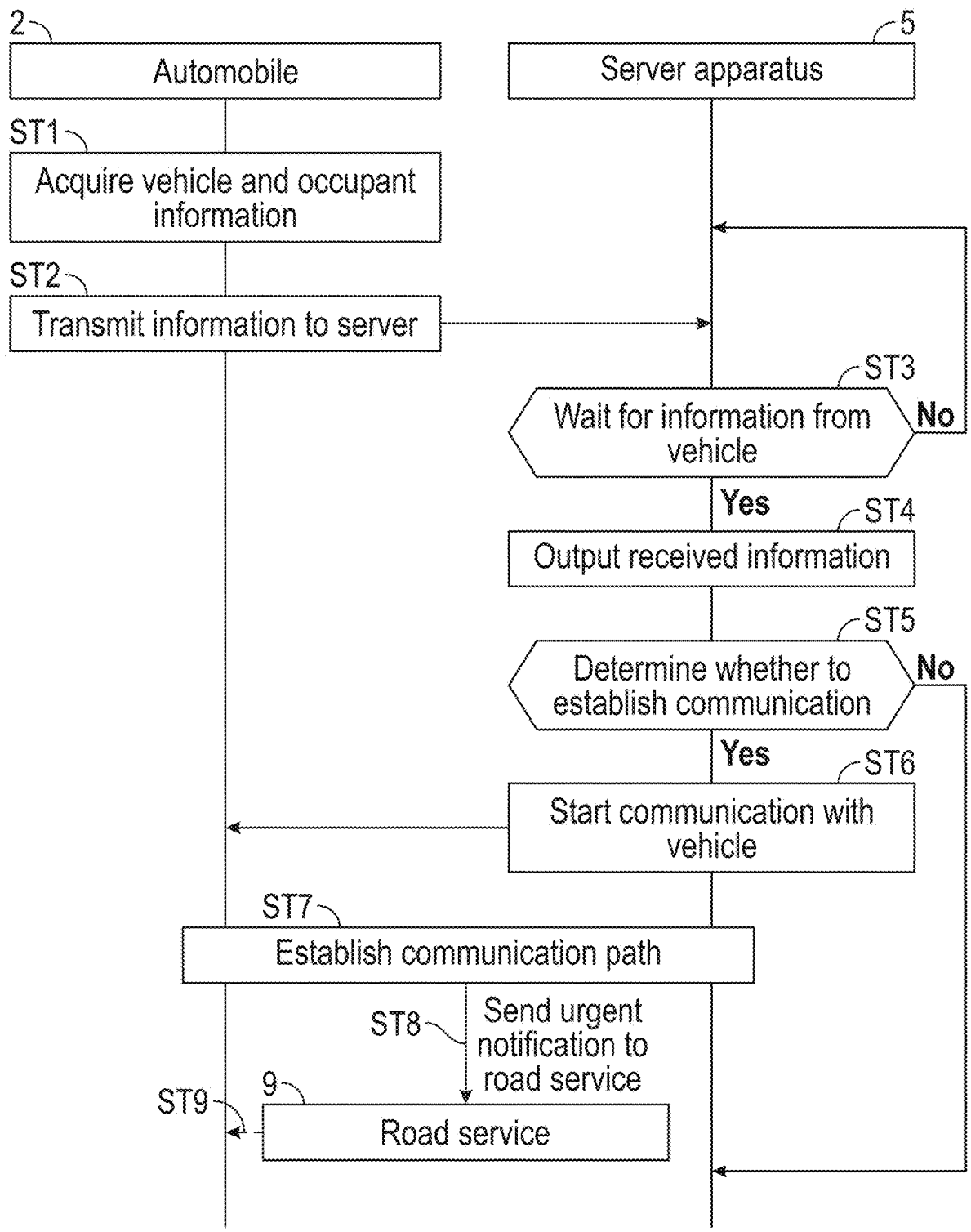
FIG. 2 is an explanatory diagram of a basic communication procedure between an automobile and a server apparatus in FIG. 1, in an example where the vehicle service providing system in FIG. 1 provides an emergency response service.

FIG. 2 is an explanatory diagram of a basic communication procedure between the automobile 2 and the server apparatus 5 in FIG. 1, in an example where the vehicle service providing system 1 in FIG. 1 provides the emergency response service.

FIG. 2 illustrates the automobile 2 and the server apparatus 5. Time flows from top to bottom.

In FIG. 2, in step ST1, the automobile 2 acquires information regarding the automobile 2 and the occupant. In step ST2, the automobile 2 transmits the acquired information to the server apparatus 5. The information to be transmitted from the automobile 2 to the server apparatus 5 may include information indicating, for example, a state of the automobile 2, and information indicating, for example, a state of the occupant.

In step ST3, the server apparatus 5 waits for information reception from the automobile 2. Upon receiving the information from the automobile 2, in step ST4, the server apparatus 5 outputs the received information by, for example, displaying the information. This makes it possible for an operator to check the information regarding the automobile 2 and the occupant. When the operator determines that it is necessary to confirm the information with the occupant, the operator makes an operation on the server apparatus 5. After outputting the received information, in step ST5, the server apparatus 5 determines whether or not to establish communication. When the server apparatus 5 accepts the operation by the operator, the server apparatus 5 determines that it is necessary to establish communication. In step ST6, the server apparatus 5 starts communication with the automobile 2. Thus, in step ST7, a communication path is established between the automobile 2 and the server apparatus 5. The communication path allows the operator and the occupant to communicate with each other by speech or video.

When the operator determines that an emergency response is necessary, based on a call with the occupant, the operator makes an operation on the server apparatus 5. In step ST8, the server apparatus 5 gives an urgent notification to a road service 9. Based on the notification, in step ST9, the road service 9 goes into action for the automobile 2. The road service 9 provides a vehicle service for the emergency response.

Thus, it is possible for the automobile 2 or the occupant to have the emergency response service provided by the vehicle service providing system 1.

As described, in the vehicle service providing system 1, to provide the vehicle service, basically, the automobile 2 transmits the information to the server apparatus 5, and the server apparatus 5 provides the service based on the received information.

Incidentally, when such a vehicle service providing system 1 provides, in particular, the emergency response service and the occupant monitoring service described above, it is desired to transmit, for example, a captured image by an in-vehicle camera 55 indicating the state of the occupant from the automobile 2 to the server apparatus 5. The captured image by the in-vehicle camera 55 is outputted to and displayed on the server apparatus 5, making it possible for the operator to accurately grasp, for example, the current state and expression of the occupant based on the captured image of the occupant. As a result, it is possible for the operator to provide, for example, an optimal service in accordance with, for example, the current state of the occupant.

On the other hand, depending on the kind of information, information transmission from the automobile 2 to the server apparatus 5 as described above is sometimes restricted based on, for example, laws and regulations. For example, in Europe, independent strict restrictions have been imposed on transmission and reception of personally identifiable information.

Moreover, a company that intends to deal with protection of such personal information would like to voluntarily put limitations on the information to be transmitted from the automobile 2 to the server apparatus 5.

The captured image of the occupant of the automobile 2 described above includes an image component of the face of the occupant. A photograph of the face of the occupant as well as, for example, the name of the occupant is personal information and deserves appropriate protection as necessary in accordance with requirement by laws and regulations.

As described, what is desired for the vehicle service providing system 1 is to protect personal information while avoiding impairment of convenience of the vehicle service providing system 1.

Figure 3:
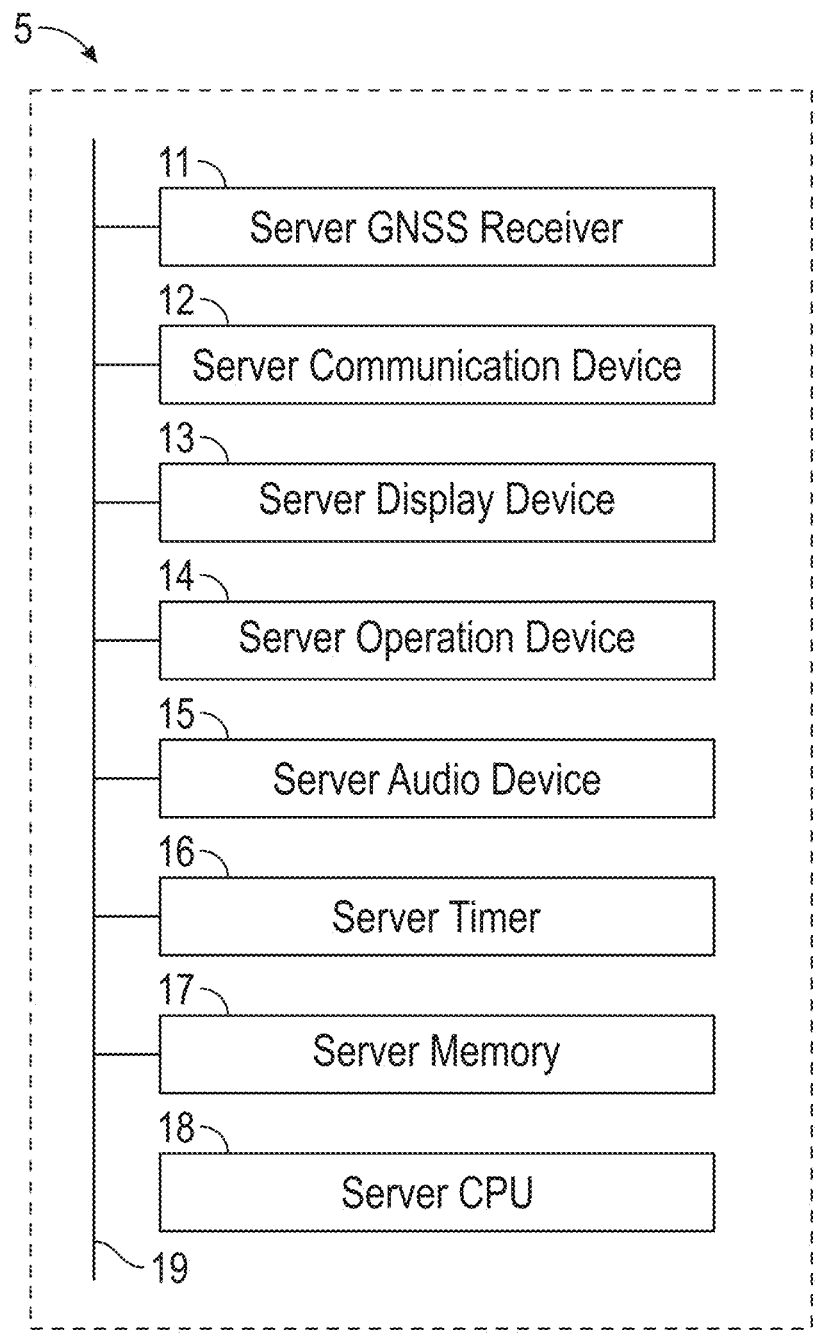
FIG. 3 is a configuration diagram of the server apparatus in FIG. 1.

FIG. 3 is a configuration diagram of the server apparatus 5 in FIG. 1. The server apparatus 5 in FIG. 3 includes a server timer 16, a server memory 17, a server central processing unit (CPU) 18, and a server bus 19 that couples them together. In addition, for example, a server GNSS receiver 11, a server communication device 12, a server display device 13, a server operation device 14, and a server audio device 15 may be coupled to the server bus 19.

The server communication device 12 is coupled to the communication network 4 of the communication network system 6. The server communication device 12 transmits and receives information to and from other devices coupled to the communication network 4, e.g., the automobile 2 and the base stations 3, through the communication network 4.

The server GNSS receiver 11 receives radio waves of GNSS satellites 110 illustrated in FIG. 1 and obtains the current time.

The server display device 13 outputs information from the server apparatus 5 by displaying the information. The server display device 13 may be, for example, a liquid crystal monitor. The server display device 13 may serve as an output unit that outputs an image, in the server apparatus 5.

The server operation device 14 is a device to be operated by the operator, in the server apparatus 5. The server operation device 14 may be, for example, a keyboard, a touch panel, etc.

The server audio device 15 is a device to be used by the operator to make a call, in the server apparatus 5. The server audio device 15 may include, for example, a speaker and a microphone.

The server timer 16 measures time or the time. The time at the server timer 16 may be calibrated based on the current time to be acquired by the server GNSS receiver 11.

The server memory 17 holds programs to be executed by the server CPU 18 and various kinds of information. The server memory 17 may include, for example, a semiconductor memory, an HDD, etc. Examples of the semiconductor memory include volatile memories such as a RAM and non-volatile memories such as a ROM and an SSD. The volatile memories temporarily hold information, and are suitable for holding, for example, personal information.

The server CPU 18 reads the programs held in the server memory 17 and executes the programs. Thus, the server CPU 18 serves as a server controller that controls the entire operation of the server apparatus 5.

The server CPU 18 serving as the server controller may perform, for example, a management control to allow the server memory 17 to temporarily hold personal information. For example, the server CPU 18 preferably deletes personal information from the server memory 17 after an end of provision of the relevant vehicle service.

Moreover, the server CPU 18 may perform a management control of information transmission and reception to and from the automobile 2 with the use of the server communication device 12. For example, when the server communication device 12 receives information from the automobile 2, the server CPU 18 may perform a control in accordance with the received information, e.g., a control for the vehicle service. This makes it possible for the server apparatus 5 to receive the information from the automobile 2 and provide the vehicle service based on the received information.

Figure 4:
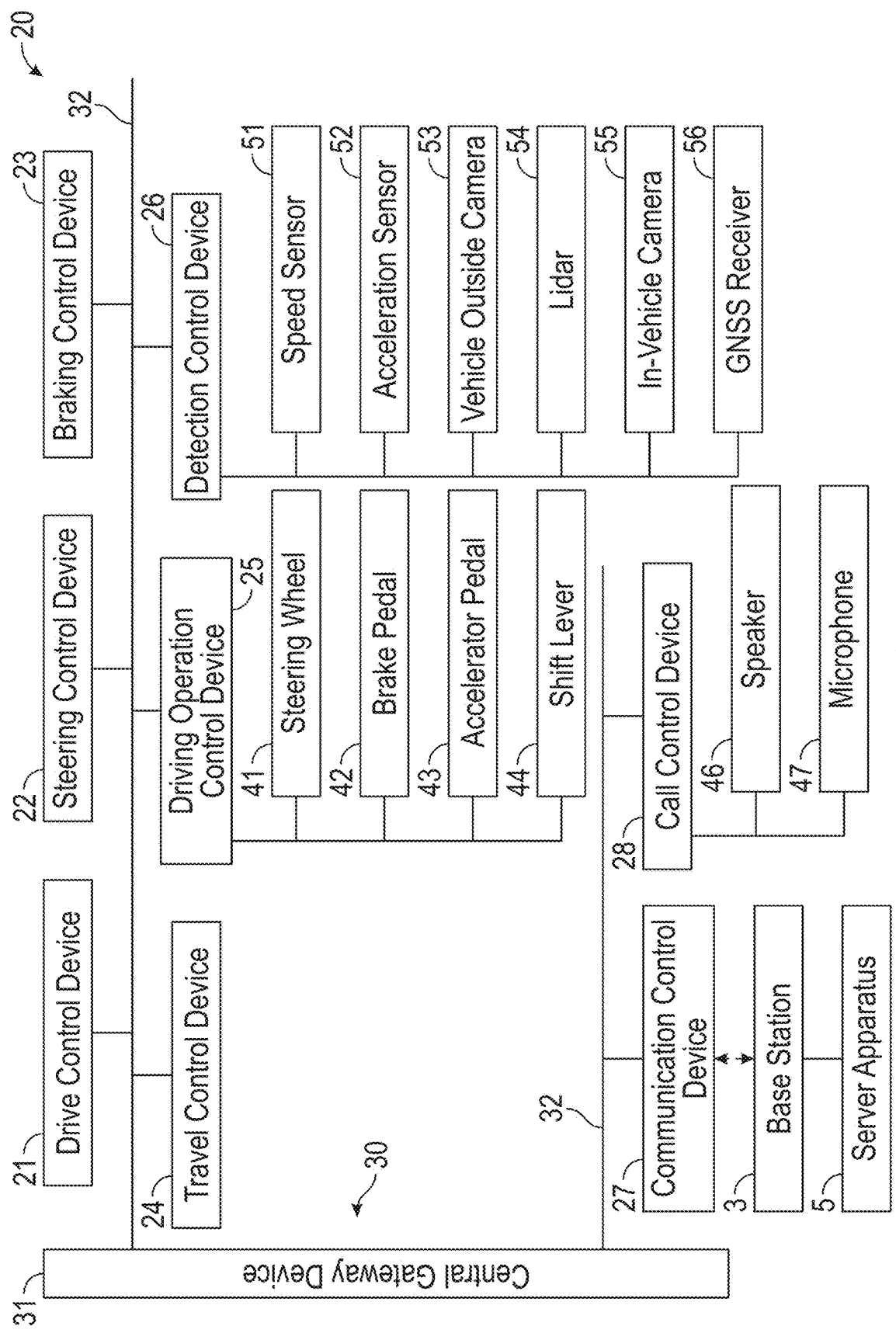
FIG. 4 is a configuration diagram of a control system of the automobile in FIG. 1.

FIG. 4 is a configuration diagram of a control system 20 of the automobile 2 in FIG. 1.

The control system 20 of the automobile 2 in FIG. 4 includes a vehicle network 30 and multiple control devices coupled to the vehicle network 30. FIG. 4 illustrates, as examples of the control devices, a drive control device 21, a steering control device 22, a braking control device 23, a travel control device 24, a driving operation control device 25, a detection control device 26, a communication control device 27, and a call control device 28. Other examples of the control devices of the automobile 2 may include, for example, an air-conditioning control device, an occupant monitoring control device, and a driving position control device.

The vehicle network 30 may comply with, for example, standards such as the controller area network (CAN) and the local interconnect network (LIN) employed in the automobile 2. Such a vehicle network 30 includes multiple bus cables 32 and a central gateway device 31. To the bus cables 32, the control devices are coupled. The central gateway device 31 serves as a relay device to which the bus cables 32 are coupled. The central gateway device 31 controls routing between the control devices through the bus cables 32. This makes it possible for each of the control devices to transmit and receive information to and from another of the control devices coupled to a different one of the bus cables 32.

To the driving operation control device 25, operation members such as a steering wheel 41, a brake pedal 42, an accelerator pedal 43, and a shift lever 44 are coupled. The operation members are operated by the driver to allow the automobile 2 to travel. The driving operation control device 25 detects an operation by the driver on the operation members, generates operation information corresponding to the operation, and outputs the operation information to the other control devices through the vehicle network 30.

The travel control device 24 controls travel of the automobile 2. For example, the travel control device 24 acquires the operation information from the driving operation control device 25 through the vehicle network 30. The travel control device 24 generates drive information, steering information, and braking information corresponding to the acquired information, and outputs the drive information, the steering information, and the braking information to the drive control device 21, the steering control device 22, and the braking control device 23 through the vehicle network 30. At this occasion, the travel control device 24 may generate the drive information, the steering information, and the braking information corresponding to the operation information as they are, or alternatively, the travel control device 24 may generate the drive information, the steering information, and the braking information adjusted to assist with the operation. Moreover, the travel control device 24 may generate drive information, steering information, and braking information for automatic travel that are not caused by an operation by the occupant.

The drive control device 21 acquires the drive information from the vehicle network 30, and controls unillustrated power sources of the automobile 2 such as an engine, a motor, and a transmission, to control magnitude and balance of a drive force of the automobile 2.

The steering control device 22 acquires the steering information from the vehicle network 30, and controls, for example, an unillustrated steering motor of the automobile 2, to control a direction of travel.

The braking control device 23 acquires the braking information from the vehicle network 30, and controls an unillustrated braking member and an unillustrated motor of the automobile 2, to control braking of the automobile 2.

The communication control device 27 communicates with one of the base stations 3 near the automobile 2 to establish a wireless communication path. The communication control device 27 transmits and receives information to and from, for example, the server apparatus 5 with the use of the wireless communication path established between the communication control device 27 and the base station 3.

To the call control device 28, a speaker 46 and a microphone 47 are coupled. The speaker 46 and the microphone 47 are used by the occupant of the automobile 2 to make a call with, for example, the operator of the server apparatus 5.

To the detection control device 26, various sensor members provided in the automobile 2 are coupled. FIG. 4 illustrates, as examples of the sensor members, a speed sensor 51, an acceleration sensor 52, a vehicle outside camera 53, a Lidar 54, the in-vehicle camera 55, and a GNSS receiver 56.

The speed sensor 51 detects a speed of the automobile 2 traveling for movement.

The acceleration sensor 52 detects an acceleration rate of the automobile 2 traveling for movement.

The vehicle outside camera 53 is a camera that captures surroundings outside the automobile 2. For example, the vehicle outside camera 53 may be a 360-degree camera that captures the entire surroundings outside the automobile 2, or alternatively, the vehicle outside camera 53 may be multiple cameras that separately capture the surroundings outside the automobile 2.

The Lidar 54 is a sensor that detects the surroundings outside the automobile 2 by using a signal such as infrared rays. The Lidar 54 generates space information regarding an outside of the automobile 2 based on reflected waves of the infrared rays.

The GNSS receiver 56 receives the radio waves of the GNSS satellites 110 illustrated in FIG. 1 and generates the current time and a current position of the automobile 2 in which the GNSS receiver 56 is provided. The GNSS satellites 110 may include a zenith satellite. The GNSS receiver 56 may also be configured to receive radio waves from a transmitter fixedly installed on the ground.

The in-vehicle camera 55 is a camera that captures an inside of the automobile 2 in which the occupant such as the driver rides. Here, the in-vehicle camera 55 may be a wide-angle camera configured to capture the driver and the assistant riding in the automobile 2 in one image. Such a wide-angle camera that captures multiple occupants riding in the automobile 2 is preferably provided in a center portion of the automobile 2 in the vehicle width direction, e.g., in a center portion of a dashboard.

The detection control device 26 outputs detection information by the sensor members and information generated based on the detection information, to the other control devices through the vehicle network 30.

For example, the detection control device 26 may record, in advance in its memory 64, information regarding a captured image of the face of the occupant by the in-vehicle camera 55. The detection control device 26 may compare the information with the currently captured image by the in-vehicle camera 55 to identify the occupant riding in the automobile 2. In this case, the detection control device 26 may output the information regarding the identified occupant to the other control devices through the vehicle network 30 as the information generated based on the detection information. Moreover, the detection control device 26 may repeatedly acquire the latest captured image by the in-vehicle camera 55 to monitor the state of the occupant. There is possibility that the occupant can feel ill while driving. Upon detecting such a change in the state of the occupant, the detection control device 26 may transmit a request for the emergency response from the communication control device 27 to the server apparatus 5. Such a detection control device 26 serves as an occupant monitoring control device.

Figure 5:
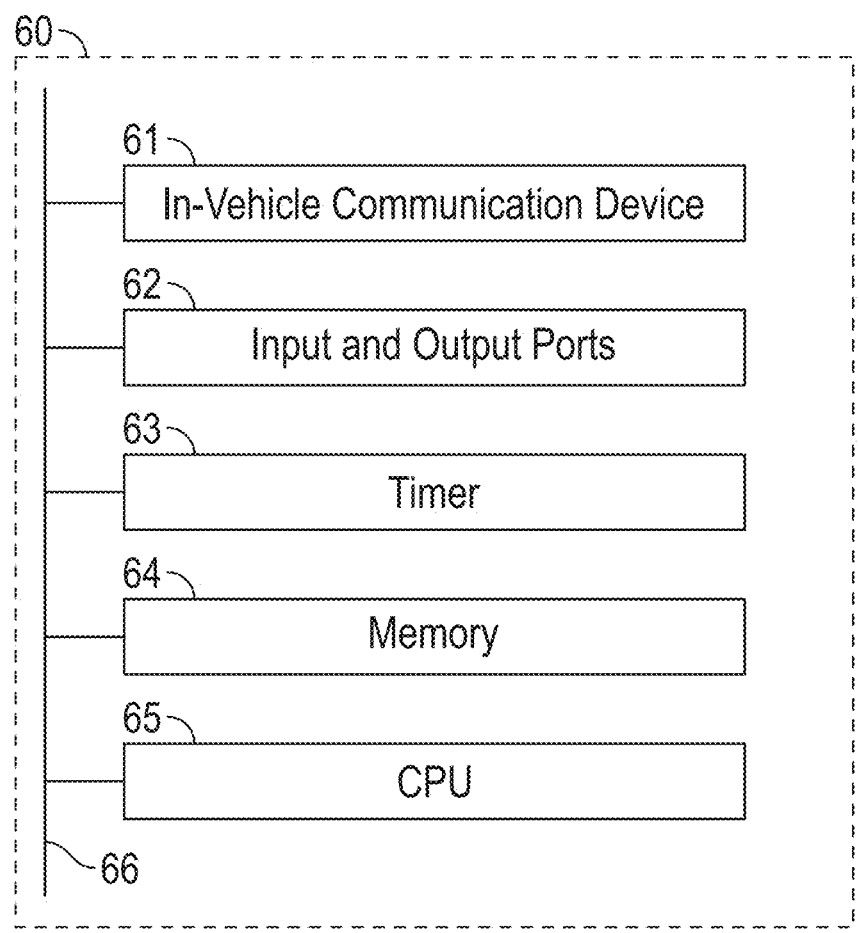
FIG. 5 is a configuration diagram of various control devices in FIG. 4.

FIG. 5 is a configuration diagram of various control devices 60 in FIG. 4.

For example, the communication control device 27 in FIG. 4 may have the configuration in FIG. 5.

The control device 60 in FIG. 5 includes an in-vehicle communication device 61, input and output ports 62, a timer 63, the memory 64, a central processing unit (CPU) 65, and an internal bus 66 that couples them together.

The in-vehicle communication device 61 is coupled to the vehicle network 30. The in-vehicle communication device 61 is supplied with information from, and outputs information to, the in-vehicle communication devices 61 of the other control devices through the vehicle network 30.

To the input and output ports 62, various members are coupled to be coupled to the control device 60. In the case of the communication control device 27, a communication device for communication with the base station 3 may be coupled.

The timer 63 measures time or the time. The time at the timer 63 may be calibrated based on the current time to be acquired by the GNSS receiver 56. This contributes to highly precise matching between the time at the server apparatus 5 and the time at the automobile 2.

The memory 64 holds programs to be executed by the CPU 65 and various kinds of information. The memory 64 may include, for example, a semiconductor memory, a HDD, etc. Examples of the semiconductor memory include volatile memories such as a RAM and non-volatile memories such as a ROM and a SSD.

The CPU 65 reads the programs held in the memory 64 and executes the programs. Thus, the CPU 65 serves as a vehicle controller that controls the entire operation of the control device 60 in which the CPU 65 is provided.

Figure 6:
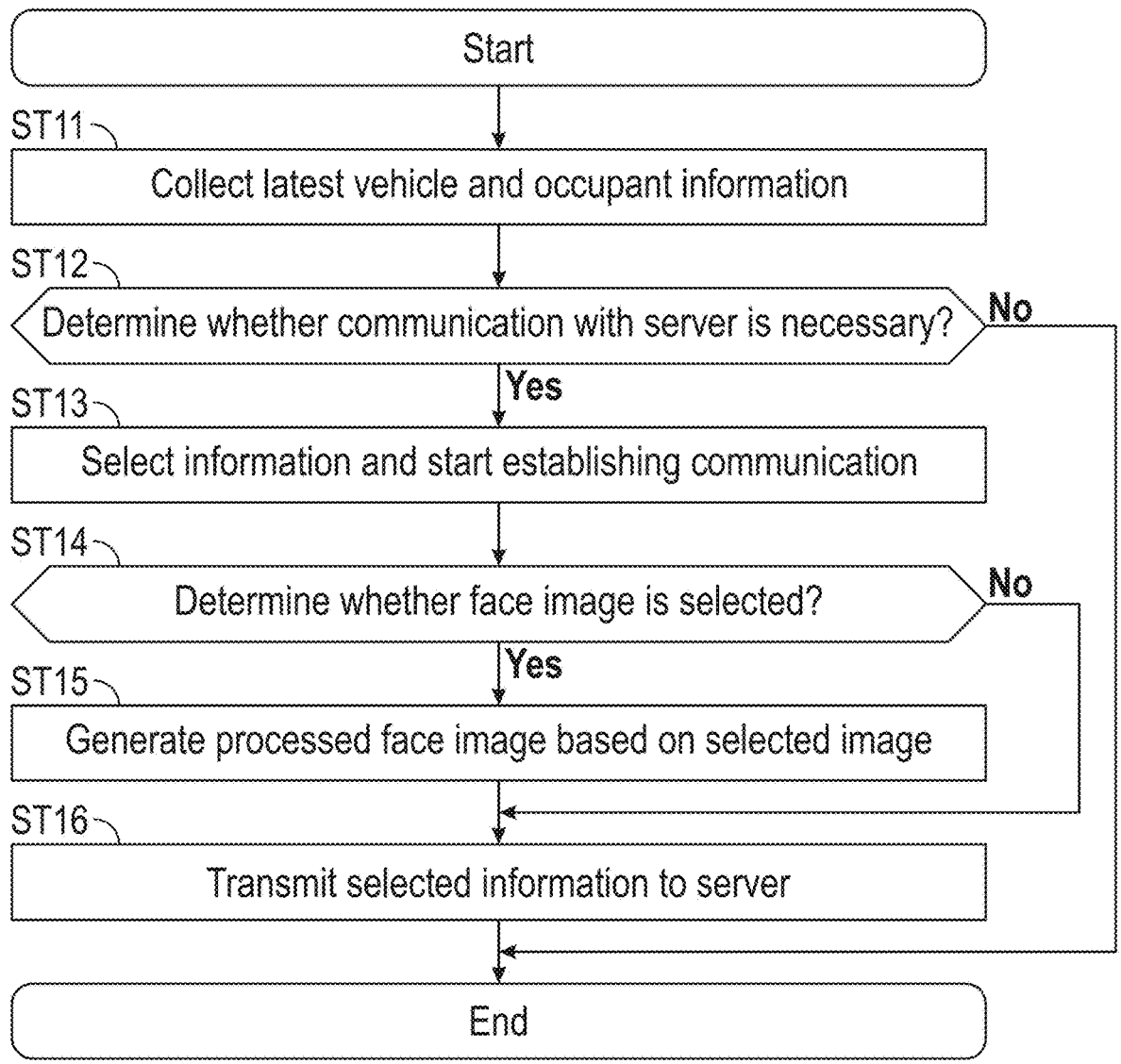
FIG. 6 is a flowchart of an information transmission control for the emergency response service, by the control system of the automobile in FIG. 4.

FIG. 6 is a flowchart of an information transmission control for the emergency response service, by the control system 20 of the automobile 2 in FIG. 4.

Here, description is given on an assumption that the CPU 65 of the communication control device 27 executes the transmission control in FIG. 6. The CPU 65 of any of the various control devices 60 included in the control system 20 of the automobile 2 in FIG. 4 may execute the transmission control in FIG. 6. Moreover, the multiple CPUs 65 of the control system 20 may cooperate to execute the transmission control in FIG. 6. The CPU 65 of the communication control device 27 repeatedly executes the transmission control in FIG. 6, for example, with the occupant riding in the automobile 2.

In step ST11, the CPU 65 collects latest vehicle information regarding the automobile 2. Here, the vehicle information may be any information collectable from each unit of the automobile 2. The vehicle information may include, for example, information indicating a travel state or a malfunction of the automobile 2, and information indicating the state or the illness of the occupant. The information indicating the state of the occupant is, for example, the captured image by the in-vehicle camera 55. The captured image by the in-vehicle camera 55 may include the occupants, e.g., the driver and the assistant, riding in the automobile 2.

In step ST12, the CPU 65 determines whether or not the state of the automobile 2 determinable based on the vehicle information necessitates communication with the server apparatus 5. When the automobile 2 has a malfunction or the occupant feels ill, when the automobile 2 is being involved in an accident, or when the occupant has made a request by, for example, operating an unillustrated button, the CPU 65 may determine, based on these pieces of information, that the communication with the server apparatus 5 is necessary. In this case, the CPU 65 causes the process to proceed to step ST13 to establish the communication with the server apparatus 5. When the CPU 65 does not determine that the communication with the server apparatus 5 is necessary, the CPU 65 ends the control.

In step ST13, the CPU 65 starts processing to establish communication with the server apparatus 5. The CPU 65 first selects information to be transmitted from the latest vehicle information collected. When the automobile 2 has a malfunction, the CPU 65 may select various kinds of information regarding the automobile 2 as the information to be transmitted. When the occupant feels ill, or when the occupant has operated the button, the CPU 65 may select various kinds of information regarding the occupant as the information to be transmitted. When the automobile 2 is being involved in an accident, the CPU 65 may select various kinds of information regarding the automobile 2 and the occupant as the information to be transmitted. When selecting various kinds of information regarding the occupant, the CPU 65 may sometimes select the captured image by the in-vehicle camera 55 including the face of the occupant.

In step ST14, the CPU 65 determines whether or not a face image of the occupant has been selected as the information to be transmitted. For example, when the captured image by the in-vehicle camera 55 including the face of the occupant has been selected as the information to be transmitted, the CPU 65 determines that the face image of the occupant has been selected, and causes the process to proceed to step ST15. When the captured image by the in-vehicle camera 55 including the face of the occupant has not been selected as the information to be transmitted, the CPU 65 causes the process to skip step ST15 and proceed to step ST16.

In step ST15, the CPU 65 generates a processed image that reflects the face image of the occupant, based on the image including the face of the occupant selected as the information to be transmitted. This processing control will be described later. Thus, the CPU 65 generates a processed face image that reflects the face image of the occupant, based on, for example, the captured image by the in-vehicle camera 55 including the face of the occupant selected as the information to be transmitted. The CPU 65 changes the face image of the occupant to be transmitted, from the captured image by the in-vehicle camera 55 to the processed face image.

In step ST16, the CPU 65 transmits the information to be transmitted, from the communication control device 27 to the server apparatus 5 through the base station 3. In a case where the processed image that reflects the face image of the occupant has been generated in step ST15, the captured image by the in-vehicle camera 55 is not transmitted. Thus, the information to be transmitted from the automobile 2 to the server apparatus 5 does not include the face image itself of the occupant actually riding in the automobile 2. This prevents the face image of the occupant actually riding in the automobile 2 from being transmitted to the server apparatus 5 through the communication network system 6, and allows the face image of the occupant to be protected as personal information.

Moreover, in the server apparatus 5, the server communication device 12 receives the transmitted information from the automobile 2. The server CPU 18 of the server apparatus 5 executes the processes of steps ST3 to ST8 in FIG. 2. Thus, the server display device 13 displays the face image based on the processed image. The operator observes and determines the state of the occupant of the automobile 2, based on the displayed face image based on the processed image. Moreover, the operator may establish a communication path with the automobile 2 and directly talk with the occupant as necessary. It is possible for the operator to favorably determine the state of the automobile 2 and the occupant, and provide an appropriate vehicle service.

Figure 7:
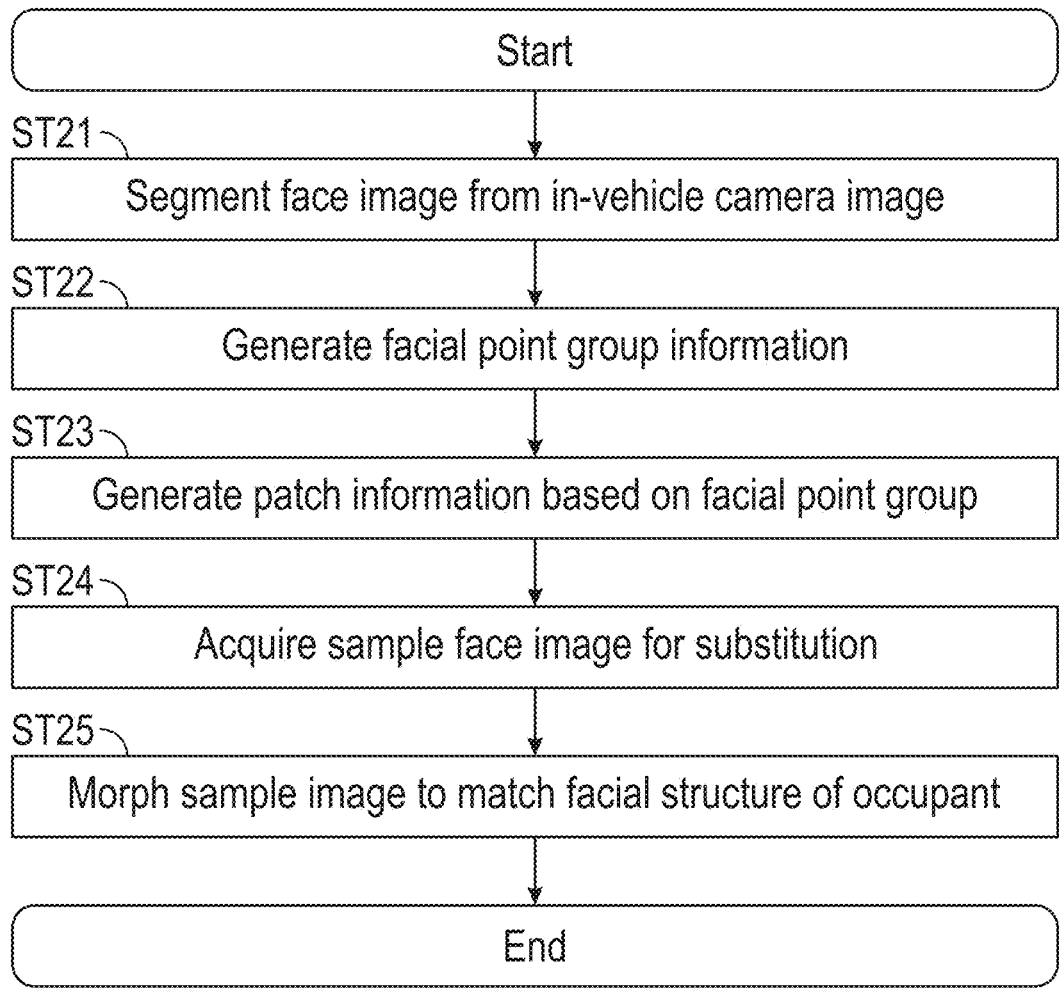
FIG. 7 is a detailed flowchart of a processed image generation control in step ST15 in FIG. 6.

FIG. 7 is a detailed flowchart of a processed image generation control in step ST15 in FIG. 6.

In step ST21, the CPU 65 segments the face image, i.e., the captured region of the face of the occupant, from the captured image by the in-vehicle camera 55 already acquired as the vehicle information acquired from each unit of the automobile 2.

Here, the face image of the occupant refers to the image including the image component of the face of the occupant.

In step ST22, the CPU 65 generates point group information regarding the segmented face image of the occupant. The point group information indicates the face of the occupant. Here, the point group information includes multiple points indicating a position of an outline of the face of the occupant in the face image of the occupant, and multiple points indicating positions of elements such as the eyebrows, the eyes, the nose, and the mouth in the face of the occupant. In addition, for example, the point group information may include multiple points indicating a position of an outline of the entire head including the face of the occupant. Moreover, the multiple points indicating the positions of the elements of the face preferably has a combination that is able to indicate a shape and a range of each of the elements. For example, the multiple points for the eyebrows preferably has a combination indicating positions of both ends of each eyebrow and a position of the midpoint of each eyebrow. The multiple points for the eyes preferably has a combination indicating positions of the inner corners of the eyes, positions of the outer corners of the eyes, positions of the upper eyelids, and positions of the lower eyelids. The multiple points for the nose preferably has a combination indicating the upper end, the lower edge, and the left and right edges of the nose, and the apex of the nose. The multiple points for the mouth preferably has a combination indicating the outer circumference of the upper lip and the outer circumference of the lower lip.

The point group information regarding the multiple points in the face of the occupant may be generated by landmark detection processing.

In step ST23, the CPU 65 generates patch information that separates the face image into multiple parts. At this occasion, the CPU 65 may generate the patch information that separates the face image, by using the point group information generated in step ST22 as a reference for image separation. The CPU 65 may generate multiple pieces of the patch information regarding the face image by, for example, a Delaunay method. In the Delaunay method, the face image is separated into multiple parts to obtain triangular patch regions.

In step ST24, the CPU 65 acquires a sample face image to be used instead of the face of the occupant. Here, another person may be a person different from the relevant occupant, preferably a person unrelated to the occupant. Examples of a sample face image based on an unrelated person include a face image resulting from synthesizing face images of multiple real persons, and a mechanically generated face image of an unreal person.

Note that it is desirable that the sample face image to be acquired here be a sample face image with which the point group information and the patch information generated in steps ST22 and ST23 regarding the face image of the occupant are already associated. However, when the point group information and the patch information are not associated, the CPU 65 may execute the processes of steps ST22 and ST23 also for the acquired sample face image, to generate the point group information and the patch information regarding the sample face image.

In step ST25, the CPU 65 executes a morphing process on the sample face image, to generate a morphed face image of the sample face image. At this occasion, the CPU 65 executes the morphing process on the sample face image, to make the point group information and the patch information of the sample face image closer to the point group information and the patch information generated regarding the occupant.

Thereafter, the CPU 65 ends the control, and causes the process to return to FIG. 6. In a case where the sample face image subjected to the morphing process to become closer to the face of the occupant has been obtained by the process in FIG. 7, the CPU 65 uses the sample face image as the face image of the occupant to be transmitted. In step ST16, the CPU 65 transmits the sample face image processed by the morphing process to the server apparatus 5, instead of the face image of the occupant of the automobile 2.

Note that the CPU 65 may transmit, to the server apparatus 5, an image in which an image region of the face of the occupant in the captured image by the in-vehicle camera 55 is substituted by the sample face image processed by the morphing process, as the face image of the occupant of the automobile 2.

Description is given next of the processed image generation control regarding the face image of the occupant of the automobile 2, with reference to a specific example.

FIG. 8 is an explanatory diagram of an example of a captured image 70 by the in-vehicle camera 55 in FIG. 4.

Because the in-vehicle camera 55 in FIG. 4 is a wide-angle camera, the captured image 70 by the in-vehicle camera 55 in FIG. 8 includes multiple occupants riding in the automobile 2, e.g., the driver and the assistant. The head of each occupant can move in the vehicle, but the entire head of each occupant fits in the captured image 70.

In this case, in step ST21 in FIG. 7, the CPU 65 segments, for example, the captured region including the face of the driver indicated by a frame of a broken line in the drawing, as a face image 71 of the driver.

FIG. 9 is an explanatory diagram of an example of the face image 71 as the captured region of the face of the driver segmented from the captured image 70 in FIG. 8.

In the face image 71 of the driver in FIG. 9, the entire head of the driver fits without being trimmed by an outer peripheral edge of the image.

Note that the CPU 65 may segment the face image 71 of the driver to include not the entire head of the driver but a region from the eyebrows to the chin tip of the driver. Even in this case, the face image 71 of the driver includes the image component of the face of the driver. As described later, the CPU 65 is configured to generate the point group information regarding the elements in the region from the eyebrows to the chin tip in the face of the driver.

However, even when a portion of the head of the driver is trimmed in this way, the CPU 65 segments the face of the driver as the face image 71 of the driver, to leave margins 77 of a predetermined width on the right and left sides of the region of the face of the driver. The margins 77 are useful in a processing process described later.

FIG. 10 is an explanatory diagram of an example of the point group information to be generated regarding the face image 71 of the driver in FIG. 9.

In step ST22 in FIG. 7, the CPU 65 is configured to generate the point group information as illustrated in FIG. 10 regarding the face image 71 of the driver in FIG. 9.

The point group information in FIG. 10 includes points 72 for the face itself, and points 73 for the outer peripheral edge as an outline of the face image itself. The points 72 may include points indicating a position of the outline of the face of the driver, and points indicating the positions of the elements, e.g., the eyebrows, the eyes, the nose, and the mouth in the face of the driver.

Here, the points 73 for the outer peripheral edge of the image are provided at each corner of the outer peripheral edge of the rectangular image, and a midpoint of each side of the rectangular image.

Because the face image 71 of the driver includes the margins 77 on the right and left sides, the points 73 for the outer peripheral edge of the image are spaced away from the points 72 for the face of the driver itself.

Moreover, the points 73 for the outer peripheral edge of the image are arranged to surround and enclose all the points 72 for the face of the driver itself.

FIG. 11 is an explanatory diagram of an example of the patch information to be generated regarding the face image 71 of the driver in FIG. 9.

In the patch information in FIG. 11, each patch has a triangle shape.

In step ST23 in FIG. 7, the CPU 65 may generate the patch information in FIG. 11 regarding the face image 71 of the driver in FIG. 9 by the Delaunay method.

The patch information in FIG. 11 includes patches 74 for the face of the driver itself and patches 75 outside the face of the driver. The CPU 65 is configured to separate the entire face image into multiple triangular patches as illustrated in FIG. 11 by a process of the Delaunay method using the points 72 for the face of the driver itself and the points 73 arranged along the outer peripheral edge of the image. The presence of the margins 77 on the left and right sides of the face image 71 of the driver makes it possible for the CPU 65 to separate the entire face image into the triangular patches without affecting the separation of the face itself into the patches.

In contrast, for example, if there are no margins 77 on the left and right sides of the face image 71 of the driver, the CPU 65 may easily separate the face image into patches by the Delaunay method differently from FIG. 11. For example, the CPU 65 may carry out the separation assuming that the points on the right and left outer peripheral edges of the image are part of the outline of the face. This results in high possibility of unfavorable patch separation as the patch information regarding the face. To avoid such a situation, in the present embodiment, as illustrated in FIG. 9 and in FIG. 12 described later, the CPU 65 segments the face image, to allow a width of the face to be about one-third of a width of the face image. For example, the CPU 65 may provide a margin of a width of at least 25% or more of the width of the face image on each of the left and right sides of the face. This makes it possible for the CPU 65 to generate the favorable patch information regarding the face as illustrated in FIG. 11 by the Delaunay method. The CPU 65 preferably segments, as the captured region of the face of the driver, a captured region of a range larger than the face of the driver at least in a width direction of the face of the driver.

As described, in a segmentation process, the CPU 65 segments the captured region of the range larger than the face of the occupant at least in the width direction of the face of the occupant, from the captured image 70 acquired from the in-vehicle camera 55, to generate the face image as the captured region of the face of the occupant. In a point group generation process, the CPU 65 generates the point group information regarding the outer peripheral edge of the segmented captured region of the face of the occupant. The point group information includes multiple points along the outer peripheral edge including the position spaced away from the face of the occupant. In a patch generation process, the CPU 65 generates the patch information with the use of the point group information regarding the points along the outer peripheral edge of the segmented captured region of the face of the occupant, together with the point group information regarding the face and indicating the position of the outline of the face and the positions of the elements of the face, as the reference for the image separation. The patch information separates the segmented captured region of the face of the occupant into triangle-based units.

Description is given next, with reference to FIGS. 12 to 14, of the information regarding a sample face image 81 to be acquired by the CPU 65 in step ST24 in FIG. 7.

FIG. 12 is an explanatory diagram of an example of the sample face image 81 as a face image of the other person different from the driver.

FIG. 13 is an explanatory diagram of an example of the point group information to be generated regarding the sample face image 81 in FIG. 12.

FIG. 14 is an explanatory diagram of an example of the patch information to be generated regarding the sample face image 81 in FIG. 12.

In FIG. 12, the entire head of the other person fits in the sample face image 81, with a margin around the outline of the head, without being trimmed by an outer peripheral edge of the image.

In this case, as illustrated in FIG. 13, the CPU 65 may generate the point group information regarding the sample face image 81 by a point group generation process for the sample face image 81. The point group information regarding the sample face image 81 in this case includes points 82 for the face itself and points 83 along the outer peripheral edge of the face image. The points 82 indicate the outline of the face and the positions of the elements of the face.

Moreover, the CPU 65 may generate the patch information by a patch generation process for the sample face image 81. The patch information separates the sample face image 81 into triangle-based units. The patch information may include patches 84 and patches 85. The patches 84 separate the face of the other person itself. The patches 85 separate an outside of the face of the other person.

The CPU 65 may generate the point group information in FIG. 13 and the patch information in FIG. 14 regarding the sample face image 81 in FIG. 12 by a similar process to the process for the face image 71 of the driver in FIG. 9.

The information regarding the sample face image 81 in FIGS. 12 to 14 may be recorded in the memory 64, before the process of step ST24 in FIG. 7. Alternatively, the CPU 65 may acquire, in the process of step ST24 in FIG. 7, the information regarding the sample face image 81 in FIGS. 12 to 14, from the server apparatus 5.

FIG. 15 is an explanatory diagram of an example of a morphed face image 100 to be transmitted from the automobile 2 to the outside as the face image of the occupant. The morphed face image 100 is an image to be transmitted from the automobile 2 to the outside, instead of the face image 71 of the driver.

In step ST25 in FIG. 7, the CPU 65 may execute the morphing process on the sample face image 81.

In the morphing process, the CPU 65 may use the information in FIGS. 12 to 14 regarding the other person and the information in FIGS. 9 to 11 regarding the driver.

The points 72 and 73 included in the point group information regarding the driver in FIG. 10 and the points 82 and 83 included in the point group information regarding the other person in FIG. 13 correspond to each other.

The patches 74 and 75 included in the patch information regarding the driver in FIG. 11 and the patches 84 and 85 included in the patch information regarding the other person in FIG. 14 correspond to each other.

As described, the point group information and the patch information regarding the other person are generated to favorably correspond to the point group information and the patch information regarding the driver.

In this case, for example, the CPU 65 may bring the positions in the image of the points 82 and 83 in the point group information regarding the other person closer to the positions in the image of the corresponding points 72 and 73 in the point group information regarding the driver.

Thus, the position and a range in the image of each of the patches 84 and 85 in the patch information regarding the other person change to overlap with the position and a range in the image of each of the patches 74 and 75 in the patch information regarding the driver.

As a result, the face of the other person in the sample face image 81 in FIG. 12 becomes closer to the face of the driver in the face image 71 in FIG. 9.

As described, the CPU 65 executes the morphing process on the sample face image 81 to make the point group information and the patch information regarding the other person closer to the point group information and the patch information regarding the occupant.

Here, when the positions in the image of the points 82 and 83 in the point group information regarding the other person overlap respectively with the positions in the image of the points 72 and 73 in the point group information regarding the driver, the sample face image 81 is morphed at a ratio of 100%. The outline of the face, the positions and sizes of the elements of the face in the sample face image 81 may be substantially the same in position and size as those of the actual driver. However, because the original image itself is not the one of the driver, but is of a different person, even if the morphing process is performed at the ratio of 100%, the sample face image 81 does not become the face image 71 itself of the driver. When the ratio of morphing is 50%, as illustrated in FIG. 15, the morphed face image 100 generated by the morphing becomes an intermediate between the face of the driver in the face image 71 in FIG. 9 and the face of the other person in the sample face image 81 in FIG. 12. Even in this case, the morphed face image 100 includes features and expression of the face of the driver at the ratio of morphing.

The CPU 65 executes the morphing process, with the ratio of morphing of the sample face image 81 assuming any value. The value of the ratio of morphing may be fixed, or alternatively, the ratio of morphing may be set at any value by, for example, the driver.

The CPU 65 transmits the sample face image 81 after the morphing process to the server apparatus 5, instead of the captured image 70 by the in-vehicle camera 55, as the face image of the occupant of the automobile 2.

It is possible for the CPU 65 to protect the face image 71 of the driver as personal information, and refrain from transmitting the face image 71 itself to the outside of the automobile 2.

As described above, in the present embodiment, the CPU 65 of the automobile 2 executes an occupant image acquisition process, the segmentation process, the point group generation process, the patch generation process, a sample face image acquisition process, and the morphing process. The server CPU 18 causes the server display device 13 serving as the output unit to output the morphed face image 100 generated by the morphing process, as the face image of the occupant of the automobile 2. Thus, the server display device 13 displays the face image that reflects, for example, the expression included in the face image of the occupant. It is possible for the operator to easily grasp, for example, the current actual state or the expression of the occupant based on the face image outputted.

In contrast, if, for example, a face image such as a fixed face image or a simply abstracted face image is displayed as the face of the occupant on the server display device 13, it is difficult for the operator to grasp, for example, the current state or the expression of the occupant based on the image. In particular, if an image in which, for example, the face of the occupant is masked is displayed, the operator is not able to grasp, for example, the current state or the expression of the occupant at all. In the present embodiment, it is possible for the server display device 13 to display the face image that reflects, for example, the current state or the expression of the occupant, which prevents such an undesirable image from being displayed.

Moreover, the CPU 65 of the automobile 2 transmits information generated by the processes to the server apparatus 5, instead of the face image 71 of the occupant. Hence, in the present embodiment, it is possible to refrain from transmitting the face image 71 of the occupant itself to the outside. The face image 71 of the occupant deserves protection as personal information regarding the occupant.

As described, in the present embodiment, it is possible to protect personal information to prevent the personal information from being excessively transmitted from the automobile 2 to the outside, while avoiding impairment of the convenience of the vehicle service providing system 1.

In the present embodiment, in the segmentation process, the CPU 65 of the automobile 2 segments, from the captured image 70 acquired from the in-vehicle camera 55, a captured region of a range larger than the face of the occupant at least in the width direction of the face of the occupant, as the captured region of the face of the occupant. Moreover, in the point group generation process, the CPU 65 generates the point group information regarding the outer peripheral edge, of the segmented face image of the occupant, spaced away from the face of the occupant. Moreover, in the patch generation process, the CPU 65 generates the patch information regarding the segmented face image of the occupant, with use of the point group information regarding the points along the outer peripheral edge of the segmented face image of the occupant, together with the point group information regarding the face and indicating the outline of the face and the positions of the elements of the face, as the reference for the image separation.

Thus, in the present embodiment, it is possible to favorably morph the entire head including, for example, an outer portion of the face such as the ears of the face of the other person in the sample face image 81, unlike a case of carrying out the morphing process on the face of the sample face image 81 based on only the point group information and the patch information based on the outline of the face and the elements of the face of the occupant. It is possible for the operator to visually recognize the well-balanced favorable "face of the occupant" in which the entire face is favorably morphed and not deformed. This allows the operator to talk with the outputted "face of the occupant", without feeling strange about the outputted "face of the occupant", and appropriately grasp, for example, the current actual state or the expression of the occupant. Moreover, the face image itself of the occupant who has been injured by, for example, an accident involving the automobile 2 is prevented from being outputted from the server apparatus 5, which makes it possible to prevent an excessive mental load from being imposed on the operator.

In the present embodiment, the in-vehicle camera 55 provided in the automobile 2 is a wide-angle camera that captures multiple occupants riding in the automobile 2. The captured image 70 by the wide-angle camera that is able to capture multiple occupants riding in the automobile 2 substantially surely includes, around each occupant, portions representing the inside of the automobile 2 and usable as the margins 77. In the case of such a wide-angle captured image 70 including the margins 77 around the occupant, it is possible to segment a captured region of a range larger than the face of the occupant at least in the width direction of the face of the occupant.

In contrast, if the captured image 70 is obtained by a narrow-angle camera that captures, for example, only the driver of the automobile 2, it is difficult for the captured image 70 to include the margins 77 representing the inside of the automobile 2, around each occupant. The face of the occupant tends to be trimmed by the outer peripheral edge of the captured image 70 by the narrow-angle camera. In this case, in the segmentation process, it is not possible to segment a captured region of a range larger than the face of the occupant at least in the width direction of the face of the occupant, from the captured image 70 acquired from the in-vehicle camera 55.

In the present embodiment, such a situation is substantially prevented, because the captured image 70 by the wide-angle camera that captures multiple occupants riding in the automobile 2 is acquired and segmented.

Note that, in the above-described embodiment, the CPU 65 of the automobile 2 executes all the processes from the occupant image acquisition process to the morphing process illustrated in FIG. 7, and transmits the sample face image 81 after the morphing process to the server apparatus 5, as information regarding the face image of the occupant.

Figure 16:
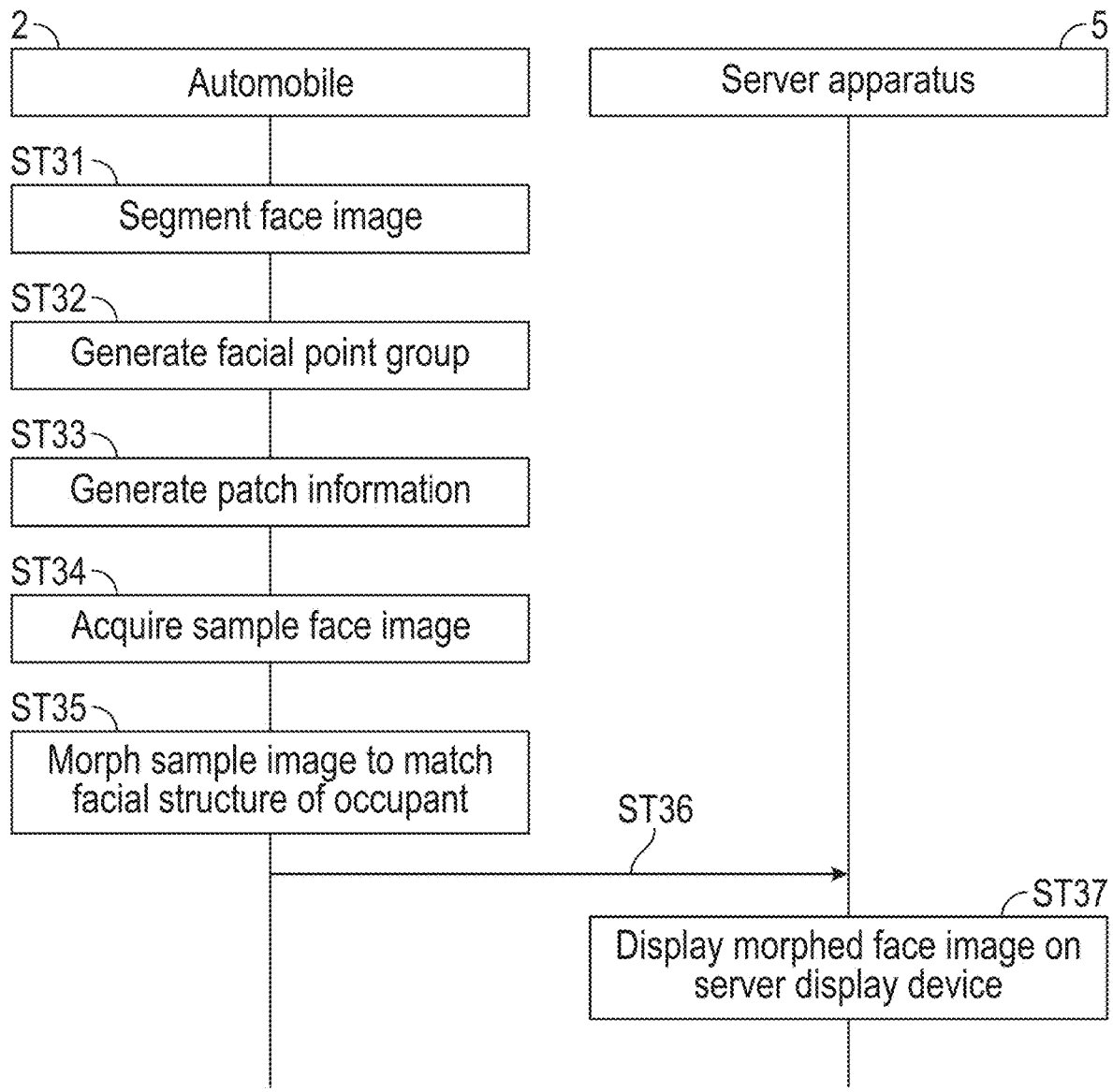
FIG. 16 is an explanatory diagram of a face image processing procedure in the first embodiment.

FIG. 16 is an explanatory diagram of a face image processing procedure in the first embodiment.

FIG. 16 illustrates the automobile 2 and the server apparatus 5. Time flows from top to bottom.

In the case of the first embodiment, after the unillustrated occupant image acquisition process, the CPU 65 of the automobile 2 executes, in steps ST31 to ST35, the segmentation process, the point group generation process, the patch generation process, the sample face image acquisition process, and the morphing process. In step ST36, the CPU 65 transmits the morphed face image 100 to the server apparatus 5, instead of the face image of the occupant of the automobile 2.

In this case, in step ST37, the server CPU 18 of the server apparatus 5 only causes the server display device 13 to output the morphed face image 100 generated by the morphing process and received from the automobile 2, as the face image of the occupant of the automobile 2.

In contrast, the CPU 65 of the automobile 2 may execute some of the processes from the occupant image acquisition process to the morphing process illustrated in FIG. 7, and transmit only information generated by the process to the server apparatus 5. The CPU 65 may execute only the occupant image acquisition process. In this case, the server CPU 18 executes processes not executed by the CPU 65, among the processes from the segmentation process to the morphing process illustrated in FIG. 7. Moreover, the server CPU 18 may cause the server display device 13 to output the morphed face image 100 generated by the own morphing process, instead of the face image of the occupant of the automobile 2.

Figure 17:
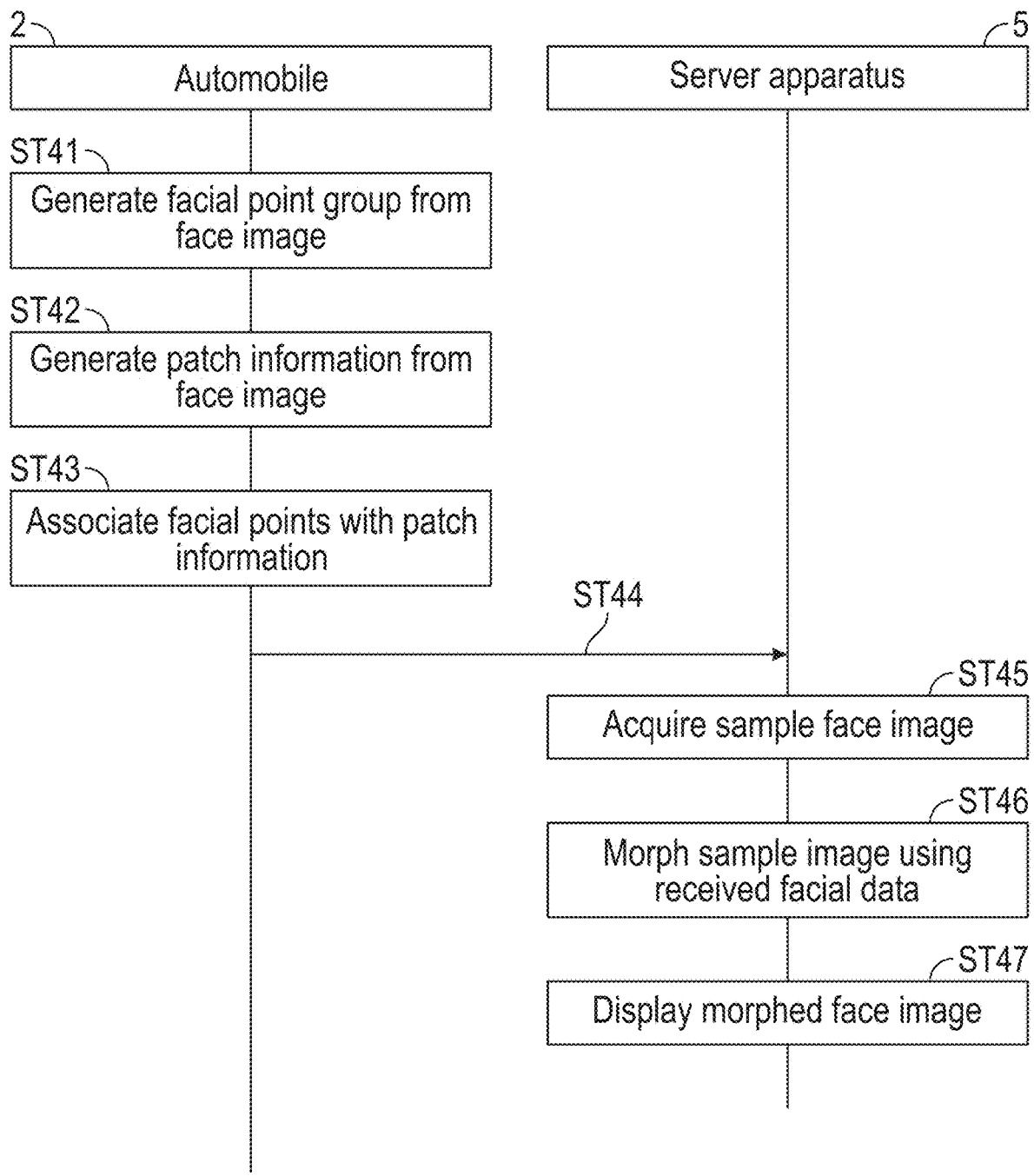
FIG. 17 is an explanatory diagram of a face image processing procedure in a modification example of the first embodiment.

FIG. 17 is an explanatory diagram of a face image processing procedure in a modification example of the first embodiment.

FIG. 17 illustrates the automobile 2 and the server apparatus 5. Time flows from top to bottom.

In the case of this modification example, the automobile 2 executes, after the unillustrated occupant image acquisition process, the segmentation process, the point group generation process, and the patch generation process.

In this case, the CPU 65 of the automobile 2 generates, in steps ST41 to ST43, the point group information and the patch information regarding the face image 71 of the driver. In step ST44, the CPU 65 transmits the generated point group information and patch information regarding the face image 71 of the driver to the server apparatus 5. In this case, the CPU 65 of the automobile 2 preferably transmits only the point group information and the patch information, while refraining from transmitting the face image 71 of the driver itself for protection of personal information.

With use of the received information, the server CPU 18 of the server apparatus 5 executes the sample face image acquisition process in step ST45 and the morphing process in step ST46. Moreover, in step ST47, the server CPU 18 causes the server display device 13 serving as the output unit to output the morphed face image 100 generated by the own morphing process, as the face image of the occupant of the automobile 2.

Even in this case, it is possible for the automobile 2 to refrain from transmitting the captured image 70 of the driver itself to the outside of the automobile 2, and protect the captured image 70 as personal information.

Second Embodiment

Description is given next of the vehicle service providing system 1 according to a second embodiment of the invention.

In the vehicle service providing system 1 according to the present embodiment, the processed image generation control is different from that in the above-described embodiment.

Configurations and processes similar to those in the above-described embodiment are denoted by reference numerals similar to those in the above-described embodiment.

Hereinafter, description is given mainly of differences from the above-described embodiment.

Figure 18:
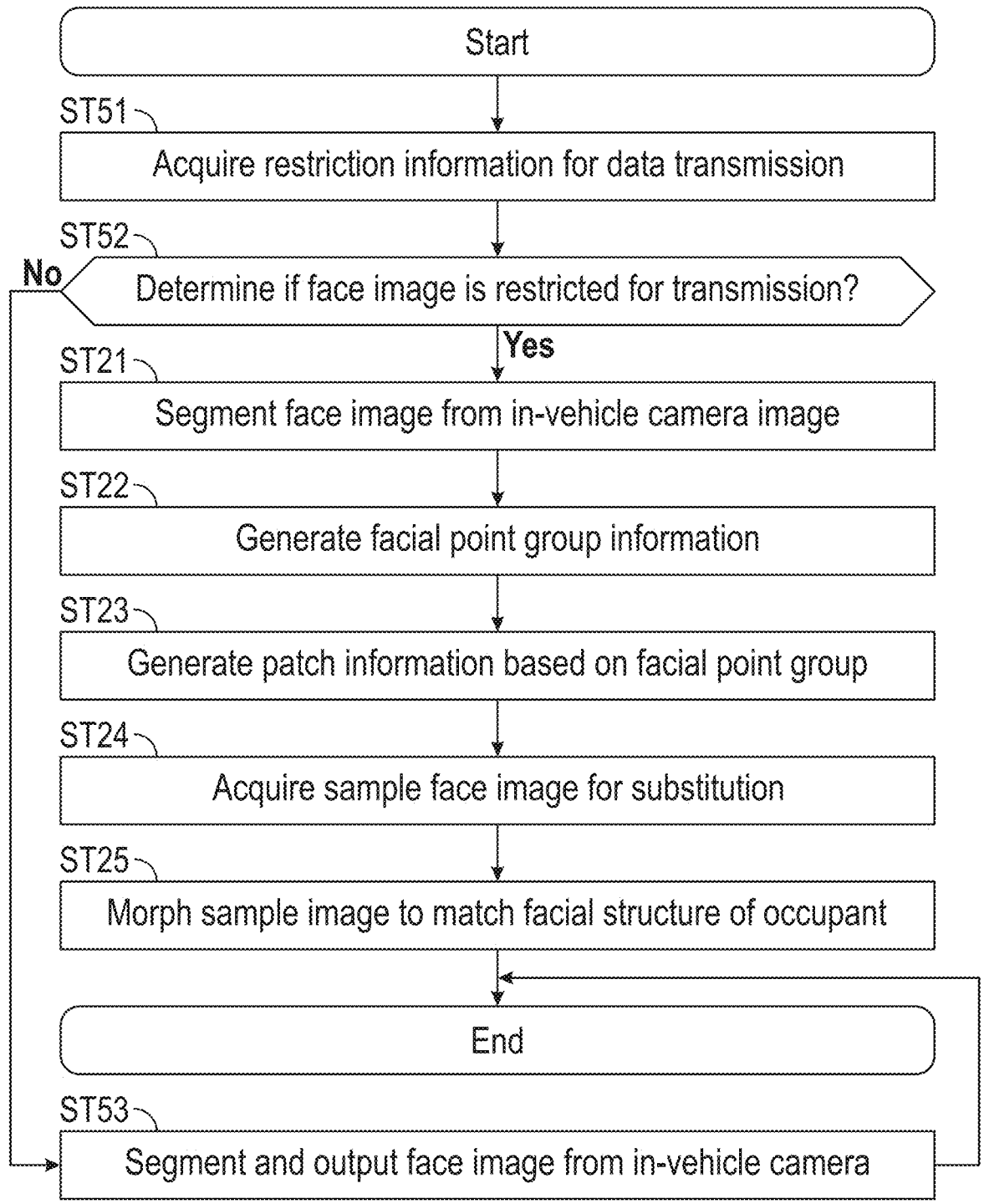
FIG. 18 is a detailed flowchart of a processed image generation control in a second embodiment of the invention.

FIG. 18 is a detailed flowchart of the processed image generation control in the second embodiment of the invention.

The CPU 65 of the communication control device 27 provided in the control system 20 of the automobile 2 may execute the processed image generation control in FIG. 18 in step ST15, when the occupant is riding in the automobile 2 and the CPU 65 is repeatedly executing the transmission control in FIG. 6.

Moreover, the memory 64 of the communication control device 27 holds restriction information regarding information to be transmitted from the automobile 2 to the outside of the automobile 2, for example, the server apparatus 5. The restriction information may be based on, for example, laws and regulations that protect personal information. Specifically, the restriction information may include, for example, information prohibited from being transmitted, for each kind of information such as the face image, the name, an address, or a public identification number of the occupant of the automobile 2. Moreover, the restriction information may include, for example, information limitedly permitted to be transmitted to the outside of the automobile 2 in a specific state.

In step ST51, the CPU 65 acquires restriction information regarding information to be transmitted from the automobile 2 to the outside of the automobile 2. The CPU 65 may acquire the restriction information from the memory 64.

In step ST52, the CPU 65 determines whether or not the face image of the occupant of the automobile 2 is a transmission restriction target, based on the restriction information held in the memory 64.

If transmission of the face image of the occupant to the outside is restricted in the restriction information, the CPU 65 determines that the face image is the transmission restriction target, and causes the process to proceed to step ST21. In this case, the CPU 65 generates, by the processes of steps ST21 to ST25, an image resulting from the morphing process on the face image of the other person as in the above-described embodiment. Thereafter, the CPU 65 ends the control, and causes the process to return to FIG. 6. The CPU 65 transmits the image resulting from the morphing process on the face image of the other person to the server apparatus 5 as the face image of the occupant.

In contrast, if transmission of the face image of the occupant to the outside is not restricted in the restriction information, the CPU 65 causes the process to proceed to step ST53.

Moreover, if transmission of the face image of the occupant to the outside of the automobile 2 is limitedly permitted, the CPU 65 causes the process to proceed to step ST53.

In step ST53, the CPU 65 segments and generates the face image of the occupant, from the wide-angle captured image 70 by the in-vehicle camera 55, as in step ST21. Thereafter, the CPU 65 ends the control, and causes the process to return to FIG. 6. The CPU 65 transmits the face image of the occupant itself segmented from the wide-angle captured image 70 by the in-vehicle camera 55 to the server apparatus 5.

As described above, when transmission of the face image of the occupant of the automobile 2 is restricted, the CPU 65 in the present embodiment executes the occupant image acquisition process, the segmentation process, the point group generation process, the patch generation process, the sample face image acquisition process, and the morphing process. The CPU 65 transmits only the morphed face image 100 generated by the morphing process to the server apparatus 5, as the face image of the occupant of the automobile 2.

In contrast, when transmission of the face image of the occupant of the automobile 2 is not restricted, the CPU 65 executes only the occupant image acquisition process and the segmentation process. The CPU 65 transmits the actual face image of the occupant generated by the segmentation process to the server apparatus 5. In this case, the server apparatus 5 outputs the face image of the occupant segmented from the in-vehicle camera 55 and received from the automobile 2 to the server display device 13 of the server apparatus 5.

As described, in the present embodiment, the morphed face image 100 is transmitted to the server apparatus 5, instead of the face image of the occupant of the automobile 2, only when transmission of the face image of the occupant of the automobile 2 is restricted.

Moreover, the restriction information held in the memory 64 in advance may be changed depending on a country or region where the automobile 2 is to be used, or may be updated with the change of times. A protection level of personal information is not a uniform and absolute level, but is changed in response to, for example, a change in trend or revision of laws and regulations. Upon such a change, updating the restriction information held in the memory 64 in advance in response to the change makes it possible to keep protecting personal information at a level corresponding to the change. To respond to such a change, the CPU 65 of the automobile 2 may carry out a control to refrain from transmitting personal information as it is from the automobile 2 to the outside.

Note that the memory 64 may hold restriction information regarding multiple countries or regions. In this case, the CPU 65 may identify a country or region where automobile 2 is currently present with use of positional information regarding the automobile 2 generated by the GNSS receiver 56, and acquire the restriction information regarding the identified country or region from the memory 64. The CPU 65 may identify a country or region where the server apparatus 5 is installed, instead of identifying the country or region where the automobile 2 is currently present, or may identify both of them. When the country or region where the automobile 2 is currently present and the country or region where the server apparatus 5 is installed are different, the CPU 65 may acquire the stricter restriction information of them from the memory 64.

Third Embodiment

Description is given next of the vehicle service providing system 1 according to a third embodiment of the invention.

In the vehicle service providing system 1 according to the present embodiment, the processed image generation control is different from that in the above-described embodiment.

Configurations and processes similar to those in the above-described embodiment are denoted by reference numerals similar to those in the above-described embodiment.

Hereinafter, description is given mainly of differences from the above-described embodiment.

Figure 19:
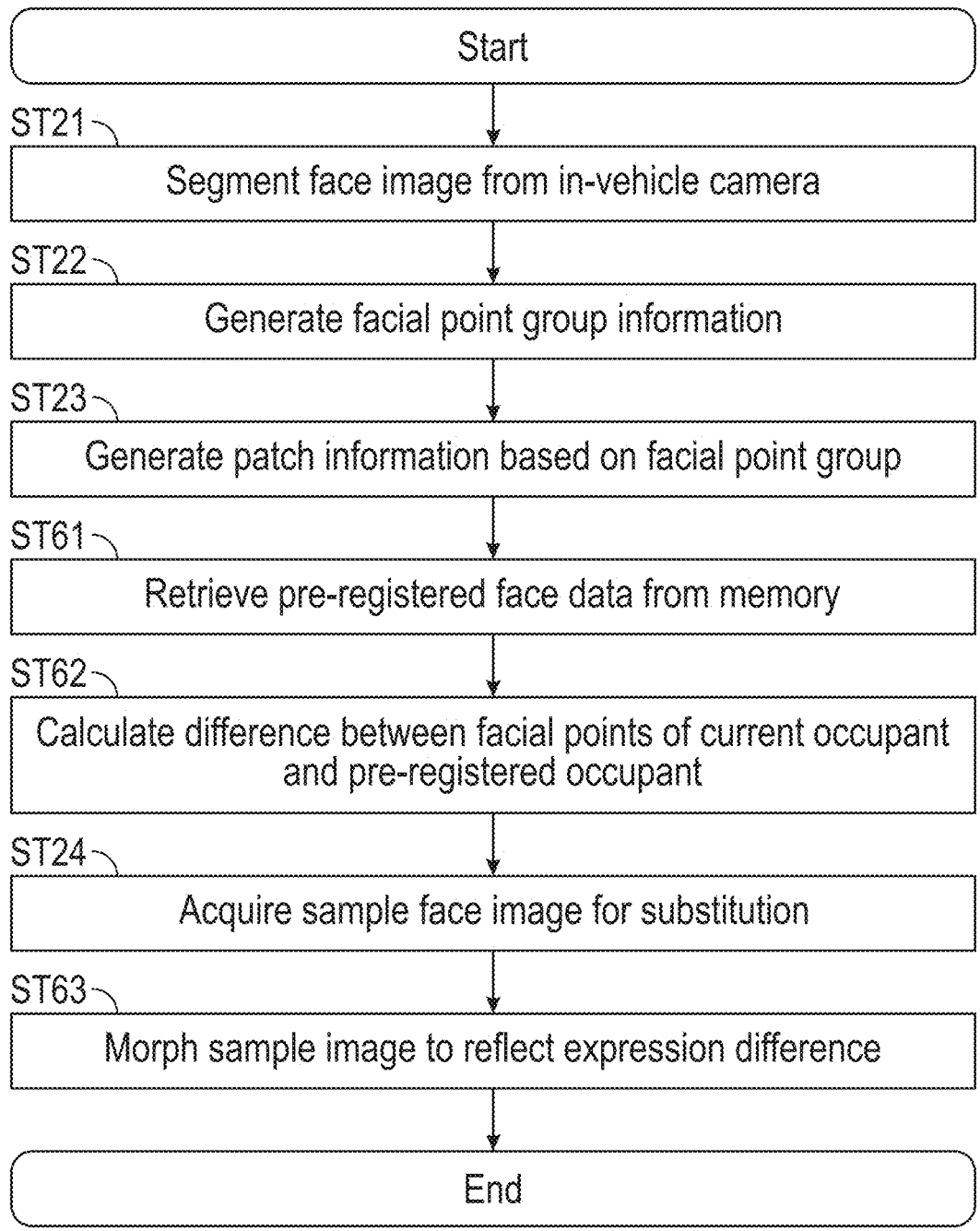
FIG. 19 is a detailed flowchart of a processed image generation control in a third embodiment of the invention.

FIG. 19 is a detailed flowchart of the processed image generation control in the third embodiment of the invention.

The CPU 65 of the communication control device 27 provided in the control system 20 of the automobile 2 may execute the processed image generation control in FIG. 19 in step ST15, when the occupant is riding in the automobile 2 and the CPU 65 is repeatedly executing the transmission control in FIG. 6.

The memory 64 of the detection control device 26 serving as the occupant monitoring control device holds, face images regarding multiple occupants registered in advance. When a new occupant gets in the automobile 2, such a detection control device 26 compares the captured region of the face of the occupant included in the captured image 70 by the in-vehicle camera 55, with the face images of the multiple occupants held in the memory 64 in advance. The detection control device 26 identifies the occupant whose face image matches the most, as the occupant who has newly gotten in the automobile 2. Each of the control devices 60 of the control system 20 of the automobile 2 in this case may execute, for example, a setting process corresponding to the identified occupant. Information regarding the face image of the occupant held in the memory 64 in advance may include the point group information and the patch information regarding the image.

The processes of steps ST21 to ST23 in FIG. 19 are similar to those in the processed image generation control in FIG. 7. After the process of generating the patch information in step ST23, the CPU 65 causes the process to proceed to step ST61.

In step ST61, the CPU 65 acquires, from the memory 64 of the detection control device 26, the information regarding the face image held in advance regarding the occupant.

When the pre-held information regarding the face image of the occupant acquired from the memory 64 does not include the point group information and the patch information regarding the image, the CPU 65 may execute the point group generation process and the patch generation process on the pre-held face image of the occupant. This allows the CPU 65 to acquire the point group information and the patch information regarding the pre-held face image of the occupant. Thereafter, the CPU 65 causes the process to proceed to step ST62.

In step ST62, the CPU 65 generates difference information regarding the face of the occupant. The CPU 65 may generate a difference between the point group information and the patch information in the face image of the occupant held in the memory 64 in advance, and the point group information and the patch information generated by the point group generation process and the patch generation process. For example, the CPU 65 may calculate a difference between the positions of the points included in the point group information regarding the face of the current occupant generated in step ST22, and the positions of the points included in the point group information regarding the pre-held face of the occupant acquired in step ST61. In general, the face image that the occupant registers in the automobile 2 in advance presumably has an expressionless face as in an identification photograph. In this case, the difference information may serve as information regarding the expression of the occupant and indicating, for example, an amount of change of the face from the expressionless face. The difference information may include less information regarding features of the shape of the face of the occupant and features of the arrangement of the elements of the face of the occupant. Thereafter, the CPU 65 causes the process to proceed to step ST24, and acquires the information regarding the sample face image 81. Thereafter, the CPU 65 causes the process to proceed to step ST63.

In step ST63, the CPU 65 executes the morphing process on the sample face image 81. Note that the CPU 65 executes the morphing process of changing the sample face image 81 with use of the difference in the point group information and the patch information regarding the face image of the occupant generated in step ST62, unlike the morphing process for blending in step ST25. In this case, the CPU 65 carries out the morphing process on the sample face image 81 by an amount of change in expression caused in the actual face of the occupant. The morphed face image 100 indicates a change in expression similar to that caused in the actual face of the occupant. In addition, the morphed face image 100 tends not to include, for example, features of the shape of the face of the occupant and features of the arrangement of the elements of the face of the occupant.

Note that, also in such a morphing process of changing the sample face image 81 with use of the difference in the point group information and the patch information, a ratio of reflection of the difference in the point group information and the patch information regarding the face image of the occupant may be set to, for example, 50% instead of 100%.

As described above, in the present embodiment, it is possible to generate the morphed face image 100 resulting from a change in expression similar to that caused in the actual face of the occupant, while suppressing personal information indicating the feature of the occupant that can be included in the morphed face image 100. Moreover, it is possible for the server apparatus 5 to output and display such a morphed face image 100, as the face image of the occupant of the automobile 2.

The embodiments described above are preferred examples of embodiments of the invention. However, the invention is not limited to those, and various modifications and alternations may be made without departing from the scope of the gist of the invention.

In the above-described embodiment, the morphed face image 100 to be used as the face image of the occupant of the automobile 2 is a face image resulting from the morphing process on the shape of the face of the other person, with use of the point group information and the patch information in the face image of the occupant.

In addition, for example, the morphed face image 100 to be used as the face image of the occupant of the automobile 2 may be a face image resulting from processing a luminance of the face of the other person, with use of a luminance of the image of the face of the occupant. A color of each portion of the face is expressed by the luminance in the image. Thus, it is expected that the face in the morphed face image 100 becomes further closer to the actual face of the occupant of the automobile 2.

Moreover, the sample face image 81 to be subjected to the morphing process may be multiple images, instead of one image. In this case, the CPU 65 of the automobile 2 or the server CPU 18 of the server apparatus 5 may select one sample face image from the multiple sample face images, and carry out the morphing process on the selected sample face image. When selecting one sample face image from the multiple sample face images, the CPU 65 of the automobile 2 or the server CPU 18 of the server apparatus 5 may select, for example, the face image whose luminance value is closest to that of the actual face of the occupant. This allows the face of the morphed face image 100 to have an appearance close to the actual face of the occupant.

Moreover, to select one sample face image for the morphing process from the multiple sample face images, the CPU 65 of the automobile 2 or the server CPU 18 of the server apparatus 5 may use information other than the luminance value of the face image. At this occasion, it is desirable not to use information by which the individual occupant is uniquely identifiable. Examples of such information regarding the occupant of the automobile 2 include attribute information regarding the occupant and not serving as personal information regarding the individual occupant, and the vehicle information regarding the automobile 2 in which the occupant is present.

Examples of the attribute information regarding the occupant and not serving as personal information include whether or not the occupant is wearing glasses, whether or not the occupant is wearing a hat, whether or not the occupant has a beard, a gender of the occupant, a patterned hairstyle of the occupant, a hair color of the occupant in the limited number of patterned colors, a color of the eyeballs of the occupant in the limited number of patterned colors, and a skin color of the occupant in the limited number of patterned colors. Each of these pieces of the attribute information regarding the occupant is not information by which an individual is identifiable for itself. Even a combination of multiple pieces of such attribute information does not make detailed information by which an individual is identifiable.

Examples of the vehicle information regarding the automobile 2 in which the occupant is present include setting information regarding the occupant in the automobile 2, information regarding the position where the automobile 2 is present, and specification information regarding the automobile 2 itself.

Examples of the setting information regarding the occupant in the automobile 2 include setting information regarding a position, a height, and an inclination of a seat, setting information regarding a position and a height of the steering wheel, accelerator operation information, and setting information regarding the individual occupant in the automobile 2.

Examples of the information regarding the position where the automobile 2 is present include the positional information obtained by the GNSS receiver 56.

Examples of the specification information regarding the automobile 2 itself include the position (the right side or the left side) of the steering wheel in the automobile 2, and specification information regarding the automobile 2 that differs between destination regions.

In this case, with the multiple sample face images may be associated, in advance, information corresponding to the attribute information regarding the occupant and not serving as personal information, and information corresponding to the vehicle information regarding the automobile 2 in which the occupant is present. With each sample face image may be associated, for example, the setting information regarding the position of the seat corresponding to a build of the other person, the setting information regarding the position of the steering wheel, the accelerator operation information, and information regarding the country or region where the other person is resident. Moreover, with each sample face image may be associated, for example, whether or not the person is wearing glasses, whether or not the person is wearing a hat, whether or not the person has a beard, a gender of the person, a patterned hairstyle of the person, a patterned hair color of the person, a patterned color of the eyeballs of the person, and a patterned skin color of the person.

The CPU 65 of the automobile 2 or the server CPU 18 of the server apparatus 5 acquires the attribute information regarding the occupant and not serving as personal information regarding the individual occupant, or the vehicle information regarding the automobile 2 in which the occupant is present. The CPU 65 or the server CPU 18 selects the sample face image in a category matching the acquired information, from multiple sample face images as a population held in, for example, the server memory 17 of the server apparatus 5.

Thus selecting, in advance, some of the sample face images as the population based on information such as the vehicle information makes it possible to reduce a processing load imposed on the CPU 65 or the server CPU 18 by selecting one sample face image to be used for the morphing process based on, for example, the luminance value of the face image. It is possible for the CPU 65 or the server CPU 18 to select one sample face image to be used for the morphing process, without making determination based on a factor such as similarity in the luminance value of the face regarding all of the sample face images as the population held in, for example, the server memory 17, by only making the determination regarding some of the sample face images.

Moreover, for example, the server memory 17 may hold information regarding the population including a large number of sample face images. It is possible for the information regarding the population to include the large number of sample face images favorably usable for each occupant.

In the above-described embodiment, the CPU 65 segments a portion of the captured image by the wide-angle in-vehicle camera 55, as the face image 71 including the face of the occupant, and executes subsequent processes on the segmented image.

In another example, the CPU 65 may use the captured image by the wide-angle in-vehicle camera 55 as it is as the face image of the occupant, and use the captured image for subsequent processes. In this case, for example, as illustrated in FIG. 8, the face image 71 includes another person different from the occupant regarding which the morphing process is to be carried out. The CPU 65 may perform the morphing process also for this other person. In another example, for the other person, the CPU 65 may abstract the image, simply substitute the image by another image, or mask the image.

The invention claimed is:

1. A vehicle service providing system comprising a vehicle and a server apparatus, the vehicle transmitting information to the server apparatus, the server apparatus providing a service based on the information received, the vehicle including an in-vehicle camera and a vehicle controller, the in-vehicle camera being configured to capture an image of an occupant of the vehicle, the server apparatus including an output unit and a server controller, the output unit outputting an image, wherein the vehicle controller is configured to execute at least an occupant image acquisition process, a segmentation process, a point group generation process, and a patch generation process, among the occupant image acquisition process, the segmentation process, the point group generation process, the patch generation process, a sample face image acquisition process, and a morphing process, the occupant image acquisition process being a process of acquiring a captured image including a face of the occupant, from the in-vehicle camera, the segmentation process being a process of segmenting a captured region of the face of the occupant from the acquired captured image, the point group generation process being a process of generating point group information regarding the face, the point group information indicating an outline of the face and positions of elements of the face, in the segmented captured region of the face of the occupant, the patch generation process being a process of generating patch information with use of the generated point group information as a reference for image separation, the patch information separating the segmented captured region of the face of the occupant, the sample face image acquisition process being a process of acquiring information regarding a sample face image with which point group information and patch information are associated, as information regarding a face image different from the occupant to be segmented from the captured image, the morphing process being a process of carrying out morphing using the point group information and the patch information generated regarding the occupant, for the point group information and the patch information regarding the sample face image, to generate a morphed face image, and transmit information generated by the processes to the server apparatus, instead of the captured image including the face of the occupant, and the server controller is configured to execute, with use of the information received from the vehicle controller of the vehicle, a process not executed by the vehicle controller, among the segmentation process, the point group generation process, the patch generation process, the sample face image acquisition process, and the morphing process, and cause the output unit to output the morphed face image generated by the morphing process, instead of a face image of the occupant of the vehicle.

2. The vehicle service providing system according to claim 1, wherein the vehicle controller segments, in the segmentation process, a captured region of a range larger than the face of the occupant at least in a width direction of the face of the occupant, as the captured region of the face of the occupant, from the captured image acquired from the in-vehicle camera, generates, in the point group generation process, point group information regarding an outer peripheral edge of the segmented captured region of the face of the occupant, the point group information including points along the outer peripheral edge, and generates, in the patch generation process, the patch information separating the segmented captured region of the face of the occupant, with use of the point group information regarding the points along the outer peripheral edge of the segmented captured region of the face of the occupant, together with the point group information regarding the face and indicating the outline of the face and the positions of the elements of the face, as the reference for the image separation.

3. The vehicle service providing system according to claim 2, wherein the in-vehicle camera comprises a wide-angle camera that captures a plurality of the occupants riding in the vehicle.

4. The vehicle service providing system according to claim 3, wherein the vehicle includes a memory that holds restriction information regarding the information to be transmitted from the vehicle to the server apparatus, and the vehicle controller determines whether or not transmission of the face image of the occupant of the vehicle is restricted, based on the restriction information held in the memory, and at least when the transmission of the face image of the occupant of the vehicle is restricted, executes the occupant image acquisition process, the segmentation process, the point group generation process, the patch generation process, the sample face image acquisition process, and the morphing process, and transmits the morphed face image generated by the morphing process to the server apparatus, instead of the face image of the occupant of the vehicle.

5. The vehicle service providing system according to claim 4, wherein when the transmission of the face image of the occupant of the vehicle is restricted, the vehicle controller executes the occupant image acquisition process, the segmentation process, the point group generation process, the patch generation process, the sample face image acquisition process, and the morphing process, and transmits the morphed face image generated by the morphing process, to the server apparatus, instead of the face image of the occupant of the vehicle, and when the transmission of the face image of the occupant of the vehicle is not restricted, the vehicle controller executes the occupant image acquisition process and the segmentation process, and transmits the captured region of the face of the occupant segmented from the captured image by the in-vehicle camera to the server apparatus, as the face image of the occupant of the vehicle.

6. The vehicle service providing system according to claim 5, wherein the memory of the vehicle holds an image of the face of the occupant of the vehicle captured in advance, and the vehicle controller further executes a difference generation process of generating a difference between point group information and patch information in a face image of the occupant held in the memory in advance, and the point group information and the patch information generated by the point group generation process and the patch generation process, and executes the morphing process with use of the generated difference in the point group information and the patch information.

7. The vehicle service providing system according to claim 2, wherein the vehicle includes a memory that holds restriction information regarding the information to be transmitted from the vehicle to the server apparatus, and the vehicle controller determines whether or not transmission of the face image of the occupant of the vehicle is restricted, based on the restriction information held in the memory, and at least when the transmission of the face image of the occupant of the vehicle is restricted, executes the occupant image acquisition process, the segmentation process, the point group generation process, the patch generation process, the sample face image acquisition process, and the morphing process, and transmits the morphed face image generated by the morphing process to the server apparatus, instead of the face image of the occupant of the vehicle.

8. The vehicle service providing system according to claim 5, wherein when the transmission of the face image of the occupant of the vehicle is restricted, the vehicle controller executes the occupant image acquisition process, the segmentation process, the point group generation process, the patch generation process, the sample face image acquisition process, and the morphing process, and transmits the morphed face image generated by the morphing process, to the server apparatus, instead of the face image of the occupant of the vehicle, and when the transmission of the face image of the occupant of the vehicle is not restricted, the vehicle controller executes the occupant image acquisition process and the segmentation process, and transmits the captured region of the face of the occupant segmented from the captured image by the in-vehicle camera to the server apparatus, as the face image of the occupant of the vehicle.

9. The vehicle service providing system according to claim 8, wherein the memory of the vehicle holds an image of the face of the occupant of the vehicle captured in advance, and the vehicle controller further executes a difference generation process of generating a difference between point group information and patch information in a face image of the occupant held in the memory in advance, and the point group information and the patch information generated by the point group generation process and the patch generation process, and executes the morphing process with use of the generated difference in the point group information and the patch information.

10. The vehicle service providing system according to claim 1, wherein the vehicle includes a memory that holds restriction information regarding the information to be transmitted from the vehicle to the server apparatus, and the vehicle controller determines whether or not transmission of the face image of the occupant of the vehicle is restricted, based on the restriction information held in the memory, and at least when the transmission of the face image of the occupant of the vehicle is restricted, executes the occupant image acquisition process, the segmentation process, the point group generation process, the patch generation process, the sample face image acquisition process, and the morphing process, and transmits the morphed face image generated by the morphing process to the server apparatus, instead of the face image of the occupant of the vehicle.

11. The vehicle service providing system according to claim 10, wherein when the transmission of the face image of the occupant of the vehicle is restricted, the vehicle controller executes the occupant image acquisition process, the segmentation process, the point group generation process, the patch generation process, the sample face image acquisition process, and the morphing process, and transmits the morphed face image generated by the morphing process, to the server apparatus, instead of the face image of the occupant of the vehicle, and when the transmission of the face image of the occupant of the vehicle is not restricted, the vehicle controller executes the occupant image acquisition process and the segmentation process, and transmits the captured region of the face of the occupant segmented from the captured image by the in-vehicle camera to the server apparatus, as the face image of the occupant of the vehicle.

12. The vehicle service providing system according to claim 11, wherein the memory of the vehicle holds an image of the face of the occupant of the vehicle captured in advance, and the vehicle controller further executes a difference generation process of generating a difference between point group information and patch information in a face image of the occupant held in the memory in advance, and the point group information and the patch information generated by the point group generation process and the patch generation process, and executes the morphing process with use of the generated difference in the point group information and the patch information.

* * * * *